US012687129B2

(12) United States Patent
Bemment et al.

(10) Patent No.: US 12,687,129 B2
(45) Date of Patent: Jul. 21, 2026

(54) GAS TURBINE OPERATION

(71) Applicant: ROLLS-ROYCE plc, London (GB)

(72) Inventors: Craig W Bemment, Derby (GB);
Benjamin J Keeler, Chesterfield (GB);
Kevin R McNally, Derby (GB);
Andrea Minelli, Derby (GB)

(73) Assignee: ROLLS-ROYCE plc, London (GB)

( * ) Notice: Subject to any disclaimer, the term of this
patent is extended or adjusted under 35
U.S.C. 154(b) by 24 days.

(21) Appl. No.: 18/420,204

(22) Filed: Jan. 23, 2024

(65) Prior Publication Data

US 2024/0401531 A1 Dec. 5, 2024

Related U.S. Application Data

(63) Continuation of application No. 18/337,749, filed on
Jun. 20, 2023, now Pat. No. 11,920,514.

(30) Foreign Application Priority Data

Dec. 21, 2022 (GB) ..................................... 2219390

(51) Int. Cl.
*F02C 7/14* (2006.01)
*F02C 7/16* (2006.01)
*F02C 7/22* (2006.01)
(52) U.S. Cl.
CPC .................. *F02C 7/14* (2013.01); *F02C 7/16*
(2013.01); *F02C 7/22* (2013.01); *F05D*
*2260/213* (2013.01); *F05D 2260/98* (2013.01)
(58) Field of Classification Search
CPC ....... C10G 2400/08; Y02T 50/60; F02C 9/40;
F02C 7/22; F02C 7/14; F02C 7/16;
(Continued)

(56) References Cited

U.S. PATENT DOCUMENTS 2,812,715 A 11/1957 Redding et al.
4,104,873 A 8/1978 Coffinberry
(Continued)

FOREIGN PATENT DOCUMENTS

EP 3 101 238 A1 12/2016
FR 3102249 A1 * 4/2021 ........... G01N 21/645
(Continued)

OTHER PUBLICATIONS

Gevo, Sustainable Aviation Fuel, Oct. 18, 2022, p. 7 (Year: 2022).*
(Continued)

*Primary Examiner* — Craig Kim
(74) *Attorney, Agent, or Firm* — Oliff PLC

(57) ABSTRACT

A method of operating a gas turbine engine and a gas turbine
engine includes a fuel delivery system arranged to provide
fuel, a combustor arranged to combust at least a proportion
of the fuel, a primary fuel-oil heat exchanger arranged to
have up to 100% of the fuel provided by the fuel delivery
system flow therethrough, and a secondary fuel-oil heat
exchanger arranged to have a proportion of the fuel from the
primary fuel-oil heat exchanger flow therethrough. Fuel is
arranged to flow from the primary fuel-oil heat exchanger to
the secondary fuel-oil heat exchanger whereas oil is
arranged to flow from the secondary fuel-oil heat exchanger
to the primary fuel-oil heat exchanger. A fuel viscosity is
adjusted to a maximum of 0.58 mm²/s on entry to the
combustor at cruise conditions.

19 Claims, 13 Drawing Sheets

(58) Field of Classification Search

CPC .... F02C 3/20; F02C 9/28; F02C 7/232; F02C 9/26; F02C 7/12; F02C 7/224; Y02P 30/20; F05D 2270/08; F05D 2270/081

See application file for complete search history.

(56) References Cited

U.S. PATENT DOCUMENTS

| | | | |
|---|---|---|---|
| 4,696,156 A | | 9/1987 | Burr et al. |
| 4,741,152 A | | 5/1988 | Burr et al. |
| 5,177,951 A | | 1/1993 | Butler |
| 5,241,814 A | | 9/1993 | Butler |
| 5,423,174 A | | 6/1995 | Mouton |
| 8,193,402 B2 * | | 6/2012 | Gruber ...................... C10L 1/06 |
| | | | 208/15 |
| 8,499,822 B2 * | | 8/2013 | Bulin ...................... F02C 7/224 |
| | | | 165/41 |
| 9,617,489 B2 | | 4/2017 | Ramirez Corredores et al. |
| 10,006,366 B2 * | | 6/2018 | Pickford ................... F02C 9/32 |
| 10,443,503 B2 | | 10/2019 | Alecu et al. |
| 10,612,467 B2 | | 4/2020 | Keeler et al. |
| 10,738,996 B1 * | | 8/2020 | Roychoudhury ....... C01B 3/386 |
| 11,591,973 B1 * | | 2/2023 | Swann ...................... F02C 9/34 |
| 11,919,847 B1 | | 3/2024 | Harvey et al. |
| 11,920,514 B1 | | 3/2024 | Bemment et al. |
| 11,939,283 B1 * | | 3/2024 | Serban ...................... C07C 2/12 |
| 2008/0250792 A1 | | 10/2008 | Wang et al. |
| 2010/0186943 A1 | | 7/2010 | Sun et al. |
| 2010/0212857 A1 | | 8/2010 | Bulin et al. |
| 2010/0319359 A1 | | 12/2010 | Holt et al. |
| 2011/0232293 A1 | | 9/2011 | Leese |
| 2011/0288352 A1 * | | 11/2011 | Peters ...................... C10L 1/04 |
| | | | 585/14 |
| 2013/0340324 A1 * | | 12/2013 | Swann ...................... F02C 3/30 |
| | | | 585/14 |
| 2014/0051897 A1 * | | 2/2014 | Peters ...................... C10L 1/04 |
| | | | 585/16 |
| 2014/0163267 A1 * | | 6/2014 | Gruber .................... C10G 3/00 |
| | | | 585/16 |
| 2014/0223917 A1 | | 8/2014 | Gameiro et al. |
| 2015/0100219 A1 * | | 4/2015 | Swann ...................... F02C 3/20 |
| | | | 701/100 |
| 2015/0100220 A1 * | | 4/2015 | Swann ...................... F02C 9/28 |
| | | | 701/100 |
| 2015/0192033 A1 * | | 7/2015 | Garassino ................ F01M 5/00 |
| | | | 62/468 |
| 2016/0024968 A1 | | 1/2016 | Stearns et al. |
| 2016/0146117 A1 * | | 5/2016 | Swann ...................... F02C 9/46 |
| | | | 60/39.19 |
| 2016/0281656 A1 | | 9/2016 | Alecu et al. |
| 2016/0298547 A1 | | 10/2016 | Ripley et al. |
| 2017/0030347 A1 | | 2/2017 | McBrien |
| 2018/0050810 A1 | | 2/2018 | Niergarth et al. |
| 2019/0101057 A1 | | 4/2019 | Stevenson et al. |
| 2019/0195143 A1 * | | 6/2019 | Allen ........................ F23R 3/00 |
| 2020/0116049 A1 | | 4/2020 | Le Brun et al. |
| 2021/0172375 A1 | | 6/2021 | Bosak et al. |
| 2022/0371971 A1 | | 11/2022 | Vardon et al. |
| 2022/0403779 A1 | | 12/2022 | Walz et al. |
| 2024/0247195 A1 * | | 7/2024 | Mathur ................. C10G 57/02 |
| 2024/0310128 A1 * | | 9/2024 | Haj-Hariri ............. F01D 5/187 |
| 2024/0328358 A1 * | | 10/2024 | Barth ........................ F02C 3/20 |

FOREIGN PATENT DOCUMENTS

| | | | | | |
|---|---|---|---|---|---|
| FR | 3 104 641 A1 | | 6/2021 | | |
| GB | 2509012 A | * | 6/2014 | ............ | F01D 25/18 |
| RU | 2565057 C2 | * | 10/2015 | ............ | C07C 1/213 |
| WO | WO-2007059783 A1 | * | 5/2007 | ............ | C10G 1/006 |

OTHER PUBLICATIONS

Silverstein et al, "Liquid Hydrogen As A Jet Fuel For High-Altitude Aircraft", 1955, NACA, NACA RM E55C28a (Year 1955).

Jun. 11, 2024 Office Action issued in United Kingdom Patent Application No. 2319076.2.

Oct. 5, 2023 Office Action issued in U.S. Appl. No. 18/337,603.

U.S. Appl. No. 18/337,603, filed Jun. 20, 2023 in the name of Bemment et al.

Reza Alidoost Dafsari et al, "Viscosity effect on the pressure swirl atomization of an alternative aviation fuel", Dec. 4, 2018, pp. 179-191.

Mar. 10, 2025 Search Report issued in French Application FR2314157.

ASTM International, "Standard Specification for Aviation Turbine Fuels", D1655-24b, Mar. 4, 2025.

* cited by examiner

8000

2000

11000

11100

11200

11300

12000

GAS TURBINE OPERATION

CROSS-REFERENCE TO RELATED APPLICATIONS

This application is a continuation of U.S. application Ser. No. 18/337,749, filed on 20 Jun. 2023, which claims priority from United Kingdom Patent Application Number 2219390.8 filed on 21 Dec. 2022. The entire contents of each of these applications are incorporated herein by reference in their entirety.

BACKGROUND

Field of the Disclosure

The present disclosure relates to aircraft propulsion systems, and to methods of operating aircraft involving the management of different fluids and heat exchange systems.

Description of the Related Art

There is an expectation in the aviation industry of a trend towards the use of fuels different from the traditional kerosene-based jet fuels generally used at present. These fuels may have differing fuel characteristics relative to petroleum-based hydrocarbon fuels.

Thus, there is a need to take account of fuel properties for these new fuels and to adjust the methods of operating gas turbine engines.

SUMMARY

According to a first aspect there is provided a method of operating a gas turbine engine, the gas turbine engine comprising:
  a fuel delivery system arranged to provide fuel;
  a combustor arranged to combust at least a proportion of the fuel;
  a primary fuel-oil heat exchanger arranged to have up to 100% of the fuel provided by the fuel delivery system flow therethrough; and
  a secondary fuel-oil heat exchanger arranged to have a proportion of the fuel from the primary fuel-oil heat exchanger flow therethrough, and wherein fuel is arranged to flow from the primary fuel-oil heat exchanger to the secondary fuel-oil heat exchanger and oil is arranged to flow from the secondary fuel-oil heat exchanger to the primary fuel-oil heat exchanger (such that the secondary fuel-oil heat exchanger transfers heat from oil just returned from lubricating and/or cooling the engine to fuel already heated in the primary fuel-oil heat exchanger);
  wherein the method comprises selecting one or more fuels such that the calorific value of the fuel provided to the combustor is at least 43.5 MJ/kg.

The inventors have appreciated that the use of fuels different from the traditional kerosene-based jet fuels, such as sustainable aviation fuels, may result in different fuel properties, and that engine operation can be optimised for these different fuel properties. Higher calorific value of a fuel reduces the required fuel burn rate for a given aircraft speed at cruise conditions, so reducing a necessary fuel flow rate to the combustor. Lower calorific value of a fuel increases the required fuel burn rate for a given aircraft speed at cruise conditions, so increasing a necessary fuel flow rate to the combustor. Especially for engine architectures in which fuel pump speed is directly linked to shaft speed (e.g. in which a shaft speed to pump speed ratio is fixed, or in which only certain shaft speed to pump speed ratios are possible, at least under cruise conditions), fuel may be wasted, or insufficient fuel may reach the engine for optimal performance, if engine operation is not adjusted. A change in fuel flow rate also has an effect on the amount of heat that can be transferred to the fuel from the oil in one or more heat exchangers. Selecting the fuel to have a calorific value in the specified range may therefore allow heat exchange arrangements to be optimised without compromising combustion performance. Control and knowledge of fuel calorific value, and accordingly of the fuel flow rates, may therefore be used to adjust and tailor heat transfer across the heat exchangers to help meet other constraints of the engine, and/or offer other benefits in the engine fuel system (e.g. reducing load on the main engine pump or reducing the risk of depositing fuel breakdown products on screens).

The selection of the fuel may comprise selecting a single fuel. The selection of the fuel may comprise selecting a fuel mixture. The selected fuel may be the only fuel on board of the aircraft. As such, the selection of the fuel may be performed during refuelling of the aircraft.

Alternatively, the selected fuel may be one of several fuels on board the aircraft, or a mixture of multiple fuels on board the aircraft. The selection may therefore be performed in flight, or may be performed prior to take-off.

The gas turbine engine may further comprise an engine core comprising a turbine, a compressor, the combustor arranged to combust a fuel, and a core shaft connecting the turbine to the compressor.

The gas turbine engine may further comprise a fan located upstream of the engine core and arranged to be driven, directly or indirectly (e.g. via a fan shaft), by rotation of the core shaft.

The primary and secondary fuel-oil heat exchangers may be described as forming part of a heat exchange system of the engine.

The proportion of the fuel from the primary heat exchanger flowing through the secondary heat exchanger may be smaller than 75%, and optionally smaller than 50%.

The fuel which passes through the secondary fuel-oil heat exchanger may not be provided to the combustor, but instead used for one or more other engine systems such as fueldraulics (e.g. for fueldraulic actuation and/or heating—for example, fueldraulic servo mechanisms may include a nacelle anti-icing system including engine actuators and/or a turbine case and/or turbine blade cooling servo valve). This fuel may then be returned to an aircraft fuel tank. The method may comprise adjusting the proportion of fuel sent to the secondary fuel-oil heat exchanger based on the calorific value of the fuel. The fuel delivery system may therefore provide fuel to all engine components which use fuel, not just to the combustor.

The calorific value of the fuel provided to the gas turbine engine may be between 43.5 MJ/kg and 44 MJ/kg. The calorific value of the fuel provided to the gas turbine engine may be at least 43.8 MJ/kg. The calorific value of the fuel provided to the gas turbine engine may be between 43.8 MJ/kg and 44 MJ/kg.

The calorific value of the fuel provided to the gas turbine engine may be approximately 43.5 MJ/kg. The calorific value of the fuel provided to the gas turbine engine may approximately 43.6 MJ/kg. The calorific value of the fuel provided to the gas turbine engine may be approximately 43.7 MJ/kg. The calorific value of the fuel provided to the gas turbine engine may be approximately 43.8 MJ/kg. The calorific value of the fuel provided to the gas turbine engine may be approximately 43.9 MJ/kg. The calorific value of the fuel provided to the gas turbine engine may be approximately 44 MJ/kg.

The fuel delivery system may be arranged to be able to obtain a plurality of different fuels from different aircraft fuel tanks. The step of selecting one or more fuels such that the calorific value of the fuel provided to the combustor is at least 43.5 MJ/kg may comprise selecting one or more tanks of the plurality of different aircraft fuel tanks from which to draw fuel. Fuels of different calorific values may therefore be mixed so as to supply a fuel mixture of the desired calorific value to the combustor.

In some implementations, the method may be employed on an aircraft with only a single fuel source, or with fuels with identical calorific values in different tanks. In such examples, the step of selecting one or more fuels such that the calorific value of the fuel provided to the combustor is at least 43.5 MJ/kg may comprise selecting an appropriate fuel on refuelling the aircraft.

The fuel delivery system may comprise a pump. The pump may be located downstream of the primary fuel-oil heat exchanger and upstream of the secondary fuel-oil heat exchanger.

The fuel delivery system may comprise a recirculation pipe arranged to allow fuel to return from one point on the fuel's flow path to an earlier point on the fuel's flow path. For example, the recirculation pipe may allow fuel leaving the pump to return to a point on the fuel flow path before the pump. The method may comprise adjusting the proportion of fuel recirculated via the recirculation pipe based on the calorific value of the fuel, thereby controlling how much fuel flows through the pump more than once as it travels towards the combustor.

In some examples, the fuel delivery system may comprise a pump located downstream of the primary fuel-oil heat exchanger and a recirculation pipe arranged to allow fuel leaving the pump to return to a point on the fuel flow path before the pump. The method may comprise adjusting the proportion of fuel recirculated via the recirculation pipe based on the calorific value of the fuel.

In alternative or additional examples, the recirculation pipe may be arranged to allow fuel leaving the primary fuel-oil heat exchanger to return to a point on the fuel flow path before the primary fuel-oil heat exchanger. The method may comprise adjusting the proportion of fuel recirculated via the recirculation pipe based on the calorific value of the fuel, thereby controlling how much fuel flows through the primary fuel-oil heat exchanger more than once as it travels towards the combustor. A proportion of the fuel leaving the primary fuel-oil heat exchanger may therefore be recirculated back to an inlet of the primary fuel-oil heat exchanger. The primary fuel-oil heat exchanger may be referred to as the primary heat exchanger for brevity in places.

According to a second aspect there is provided a gas turbine engine for an aircraft, the gas turbine engine comprising:

a fuel delivery system arranged to provide fuel;

a combustor arranged to combust at least a proportion of the fuel;

a primary fuel-oil heat exchanger arranged to have up to 100% of the fuel provided by the fuel delivery system flow therethrough; and a secondary fuel-oil heat exchanger arranged to have a proportion of the fuel from the primary fuel-oil heat exchanger flow therethrough, and wherein fuel is arranged to flow from the primary fuel-oil heat exchanger to the secondary fuel-oil heat exchanger and oil is arranged to flow from the secondary fuel-oil heat exchanger to the primary fuel-oil heat exchanger (such that the secondary fuel-oil heat exchanger transfers heat from oil just returned from lubricating and/or cooling the engine to fuel already heated in the primary fuel-oil heat exchanger); and wherein the calorific value of the fuel provided to the combustor is at least 43.5 MJ/kg.

The gas turbine engine may further comprise an engine core comprising a turbine, a compressor, the combustor arranged to combust a fuel, and a core shaft connecting the turbine to the compressor.

The gas turbine engine may further comprise one or more pumps, valves, recirculation pipes, and/or bypass pipes to allow flows of oil and/or fuel through and around the primary and/or secondary fuel-oil heat exchanger may have associated therewith to be controlled so as to tailor heat transfer between the oil and fuel.

The gas turbine engine may further comprise a fan located upstream of the engine core and arranged to be driven, directly or indirectly (e.g. via a fan shaft), by rotation of the core shaft.

The fuel delivery system may comprise a recirculation pipe arranged to allow fuel to return from one point on the fuel's flow path to an earlier point on the fuel's flow path. For example, the recirculation pipe may take a proportion of the fuel from the outlet of the primary heat exchanger back to the inlet of the primary heat exchanger. The fuel delivery system may therefore comprise a recirculation pipe arranged to divert a proportion of the fuel leaving the primary heat exchanger back to an inlet of the primary heat exchanger.

The fuel delivery system may comprise a pump between the two fuel-oil heat exchangers. In such embodiments in which a recirculation pipe is also present, the recirculation pipe may take a proportion of the fuel from the outlet of the pump to the inlet of the primary heat exchanger (which is before the pump) or directly to the inlet of the pump.

The gas turbine engine may further comprise an engine core comprising a turbine, a compressor, a core shaft connecting the turbine to the compressor and the combustor. The gas turbine engine may further comprise a fan located upstream of the engine core, wherein the fan is driven by the core shaft.

The gas turbine engine may be a direct drive engine.

The gas turbine engine may further comprise an accessory gearbox and a pump shaft, wherein the accessory gearbox receives an input from the core shaft and outputs drive to the fuel pump via the pump shaft. The pump speed may therefore be linked to core shaft rotation speed, and may have, by means of the gearbox, a fixed speed relationship between the core shaft (or in some engine architectures, another intermediate shaft) and the fuel pump. In some implementations, the accessory gearbox may instead be arranged to provide a fixed number of different speeds for a given core shaft speed.

The gas turbine engine may further comprise engine bearing chambers. These engine bearing chambers may be cooled using the flow of oil prior to the oil flowing through the fuel-oil heat exchangers. The oil exiting the engine bearing chambers may be hotter than the oil entering the engine bearing chambers. The oil flow path may be a loop, such that the oil is cooled by the fuel-oil heat exchangers before entering the engine bearing chambers, then the hotter oil exiting the engine bearing chambers is recirculated to the fuel-oil heat exchangers.

The fuel delivery system may comprise a pump, wherein the pump is located downstream of the primary fuel-oil heat exchanger and upstream of the secondary fuel-oil heat exchanger.

It is envisaged that all features described for the first aspect can equally apply to the second aspect.

According to a third aspect there is provided a method of operating a gas turbine engine, the gas turbine engine comprising:

a fuel delivery system arranged to provide fuel;

a combustor arranged to combust at least a proportion of the fuel; a primary fuel-oil heat exchanger arranged to have up to 100% of the fuel provided by the fuel delivery system flow therethrough; and a secondary fuel-oil heat exchanger arranged to have a proportion of the fuel from the primary fuel-oil heat exchanger flow therethrough, and wherein fuel is arranged to flow from the primary fuel-oil heat exchanger to the secondary fuel-oil heat exchanger and oil is arranged to flow from the secondary fuel-oil heat exchanger to the primary fuel-oil heat exchanger (such that the secondary fuel-oil heat exchanger transfers heat from oil just returned from lubricating and/or cooling the engine to fuel already heated in the primary fuel-oil heat exchanger); and wherein the method comprises transferring 200-600 kJ/m$^3$ of heat to the fuel from the oil in the primary fuel-oil heat exchanger at cruise conditions.

It will be appreciated that the heat transfer is noted per unit volume (m$^3$) of fuel reaching the combustor so as to adjust for fuel flow rate and any recirculation through the primary fuel-oil heat exchanger or bypass of the primary fuel-oil heat exchanger as described below. The amount of heat transferred to the fuel may therefore be calculated based on a temperature of fuel on approach or entry to the combustor as compared to a temperature of fuel in a fuel tank of the aircraft, taking into account heat transferred from other sources to fuel which reaches the combustor (e.g. heat transferred from the oil to the fuel in the secondary fuel-oil heat exchanger, in implementations in which that fuel is sent to the combustor instead of being sent back to a fuel tank for later recirculation).

The primary and secondary fuel-oil heat exchangers may be described as forming part of a heat exchange system of the engine.

The inventors have appreciated that the use of fuels different from the traditional kerosene-based jet fuels, such as sustainable aviation fuels for example, may allow for more heat to be transferred from the oil to the fuel per unit volume of the fuel through the heat exchange system (for example if the fuel has a higher heat capacity and/.or a higher thermal breakdown temperature). Higher fuel temperatures on entry to the combustor may allow for a method providing improved oil cooling (as the fuel is able to take more heat) and/or improved fuel burn efficiency. It will be appreciated that fuel properties on entry to the combustor can affect engine performance, e.g. due to droplet size and nozzle spray characteristics which influence fuel-air mixing and combustion efficiency, and that raising the fuel temperature as described may improve these properties. In addition, the cooler oil may allow more heat to be carried away from engine components such as bearings for the same oil flow rate, or may allow a lower oil flow rate to be used for the same level of cooling.

It will be appreciated that if the fuel receives more heat from the oil before the fuel goes into the combustor (particularly in implementations in which the corresponding additional energy has not simply been dumped to the outside environment, e.g. via an oil-air heat exchanger), then the temperature rise between air entering the combustor and air leaving the combustor will be (very slightly) greater for the same fuel flow. Thus the turbine can extract more work, and engine efficiency is (very slightly) improved. As such, a (very slightly) lower fuel-flow rate can be used to achieve the same thrust, thus specific fuel consumption (SFC) may be reduced, i.e. improved. It will be appreciated that even a small improvement in SFC may provide significant benefit across a fleet of aircraft/on long flights.

The method may comprise transferring 300-500 kJ/m$^3$ of heat to the fuel from the oil in the primary fuel-oil heat exchanger at cruise conditions.

The method may comprise transferring 350-450 kJ/m$^3$ of heat to the fuel from the oil in the primary fuel-oil heat exchanger at cruise conditions.

The method may comprise transferring 400 kJ/m$^3$ of heat to the fuel from the oil in the primary fuel-oil heat exchanger at cruise conditions.

The method may further comprise transferring 40-170 kJ/m$^3$ of heat to the fuel from the oil in the secondary fuel-oil heat exchanger at cruise conditions (heat transfer for the second heat exchanger being measured per m$^3$ of fuel passing through the secondary fuel-oil heat exchanger), in addition to the heat transferred using the primary fuel-oil heat exchanger.

In some implementations, fuel which passes through the secondary fuel-oil heat exchanger is not passed to the combustor, but rather used in one or more auxiliary systems (e.g. fueldraulics such as those mentioned above) and then returned to a fuel tank. In such implementations, at least substantially all of the temperature rise of the fuel from tank to combustor (and therefore at least substantially all of the heat transferred to the fuel) may be attributed to the primary heat exchanger. The fuel delivery system may therefore provide fuel to all engine components which use fuel, not just to the combustor.

As for the primary fuel-oil heat exchanger, the secondary fuel-oil heat exchanger may be referred to simply as the secondary heat exchanger herein, for brevity.

In some other implementations, fuel which passes through the secondary fuel-oil heat exchanger may be passed to the combustor. In such implementations, as the secondary fuel-oil heat exchanger transfers additional heat from the oil to the fuel at cruise conditions, the amount of heat transferred in the primary fuel-oil heat exchanger may be towards the lower end of the listed ranges. In such implementations, a proportion of the temperature rise of the fuel from tank to combustor (and therefore a proportion of the heat transferred to the fuel) may be attributed to the primary heat exchanger and the remainder to the secondary heat exchanger—knowledge of the heat exchange system and current flow rates and temperatures, optionally including temperature measurements taken at the exit of the secondary fuel-oil heat exchanger and on entrance to the combustor by one or more temperature sensors, may allow these proportions to be determined. Number and position of sensors may vary between implementations. It will be appreciated that, for a known heat exchanger, an outlet temperature can be calculated based on inlet temperature and flow rate of the first flow (e.g. fuel) and flow properties of the heat transfer fluid (e.g. oil) and that sensor location is therefore adjustable.

The fuel delivery system may comprise a recirculation pipe arranged to allow fuel leaving the primary heat exchanger to return to a point on the fuel flow path before the primary heat exchanger. The method may comprise adjusting a proportion of fuel recirculated via the recirculation pipe based on the amount of heat still to be transferred to the fuel before it reaches the combustor. The fuel may therefore pass through the primary heat exchanger multiple times to ensure that sufficient heat is transferred to it.

According to a fourth aspect there is provided a gas turbine engine for an aircraft, the gas turbine engine comprising:

a fuel delivery system arranged to provide fuel;

a combustor arranged to combust at least a proportion of the fuel; a primary fuel-oil heat exchanger arranged to have up to 100% of the fuel provided by the fuel delivery system flow therethrough; and a secondary fuel-oil heat exchanger arranged to have a proportion of the fuel from the primary fuel-oil heat exchanger flow therethrough, and wherein fuel is arranged to flow from the primary fuel-oil heat exchanger to the secondary fuel-oil heat exchanger and oil is arranged to flow from the secondary fuel-oil heat exchanger to the primary fuel-oil heat exchanger (such that the secondary fuel-oil heat exchanger transfers heat from oil just returned from lubricating and/or cooling the engine to fuel already heated in the primary fuel-oil heat exchanger); and wherein the primary fuel-oil heat exchanger is arranged to transfer 200-600 kJ/m³ of heat to the fuel from the oil at cruise conditions.

The gas turbine engine may further comprise an engine core comprising a turbine, a compressor, the combustor arranged to combust a fuel, and a core shaft connecting the turbine to the compressor.

The gas turbine engine may further comprise a fan located upstream of the engine core and arranged to be driven, directly or indirectly (e.g. via a fan shaft), by rotation of the core shaft.

The gas turbine engine may further comprise one or more pumps, valves, recirculation pipes, and/or bypass pipes to allow flows of oil and/or fuel through and around the primary and/or secondary fuel-oil heat exchanger may have associated therewith to be controlled so as to tailor heat transfer between the oil and fuel.

The heat exchange system may be arranged to transfer 300-500 kJ/m³ of heat to the fuel from the oil in the primary fuel-oil heat exchanger at cruise conditions.

The heat exchange system may be arranged to transfer 350-450 kJ/m³ of heat to the fuel from the oil in the primary fuel-oil heat exchanger at cruise conditions.

The heat exchange system may be arranged to transfer 400 kJ/m³ of heat to the fuel from the oil in the primary fuel-oil heat exchanger at cruise conditions.

The fuel delivery system may comprise a recirculation pipe arranged to allow fuel leaving the primary heat exchanger to return to a point on the fuel flow path before the primary heat exchanger.

It is envisaged that all features described for the third aspect can equally apply to the fourth aspect.

In addition, any or all features of the first or second aspects may be used in conjunction with features of the third and/or fourth aspects.

According to a fifth aspect there is provided method of operating a gas turbine engine, the gas turbine engine comprising: a fuel delivery system arranged to provide fuel;

a combustor arranged to combust at least a proportion of the fuel; a primary fuel-oil heat exchanger arranged to have up to 100% of the fuel provided by the fuel delivery system flow therethrough; and a secondary fuel-oil heat exchanger arranged to have a proportion of the fuel from the primary fuel-oil heat exchanger flow therethrough, and wherein fuel is arranged to flow from the primary fuel-oil heat exchanger to the secondary fuel-oil heat exchanger and oil is arranged to flow from the secondary fuel-oil heat exchanger to the primary fuel-oil heat exchanger (such that the secondary fuel-oil heat exchanger transfers heat from oil just returned from lubricating and/or cooling the engine to fuel already heated in the primary fuel-oil heat exchanger); and wherein the method comprises using at least one of the primary fuel-oil heat exchanger and the secondary fuel-oil heat exchanger to heat the fuel so as to adjust the fuel viscosity to a maximum of 0.58 mm²/s on entry to the combustor at cruise conditions.

The inventors have appreciated that, especially with the use of fuels different from the traditional kerosene-based jet fuels, such as sustainable aviation fuels, fuel properties at cruise conditions may be controlled by careful engine management so as to improve performance. In this instance, a lower viscosity can be obtained, which can affect combustion efficiency, in particular with respect to fuel nozzle spray performance within the combustor (e.g. droplet size and spray pattern). Fuel nozzle spray performance affects burn efficiency of the fuel. A lower viscosity of the fuel at cruise conditions may lend itself to a more efficient engine. Fuel flow can be optimised to improve the efficiency of the turbine engine, to which the lower viscosity of said fuel can contribute.

For example, fuel viscosity affects how fuel is delivered into and ignited by the combustor. Viscosity may affect droplet size from fuel spray nozzles, which may in turn impact burn efficiency. Taking the fuel viscosity into account when delivering fuel to the combustor, and controlling it as appropriate by varying heat input, may therefore provide more efficient fuel-burn, improving aircraft performance. It will be appreciated that lowering viscosity too far may worsen burn efficiency and/or deleteriously affect the lubrication of engine components (e.g. pump bearings) by the fuel, however. Further, a low fuel viscosity may increase laminar leakages within certain components. A minimum viscosity may therefore also be selected. For example, the method may comprise using at least one of the primary fuel-oil heat exchanger and the secondary fuel-oil heat exchanger to heat the fuel so as to adjust the fuel viscosity to above 0.2 mm²/s, 0.25 mm²/s, 0.3 mm²/s, 0.35 mm²/s, or 0.4 mm²/s on entry to the combustor at cruise conditions.

The adjusting step may reduce the fuel viscosity to below (or equal to) the specified maximum value whilst allowing it to remain above (or equal to) a specified minimum value.

The primary and secondary fuel-oil heat exchangers may be described as forming part of a heat exchange system of the engine.

The method may comprise transferring heat to the fuel, using the heat exchange system, before the fuel enters the combustor so as to lower the fuel viscosity to between 0.58 mm²/s and 0.30 mm²/s on entry to the combustor at cruise conditions.

The method may comprise transferring heat to the fuel before the fuel enters the combustor so to lower the fuel viscosity to between 0.50 mm²/s and 0.35 mm²/s, or between 0.48 mm²/s and 0.40 mm²/s, or between 0.44 mm²/s and 0.42 mm²/s on entry to the combustor at cruise conditions.

The method may comprise using at least one of the primary fuel-oil heat exchanger and the secondary fuel-oil heat exchanger to heat the fuel so as to adjust the fuel temperature to at least 135° C., 140° C., 150° C., 160° C., 170° C., 180° C., 190° C., or 200° C. on entry to the combustor at cruise conditions.

In some examples, the fuel temperature may be raised to an average of between 135-150° C., 135-160° C., 135-170° C., 135-180° C., 135-190° C., or 135-200° C. on entry to the combustor at cruise conditions.

The fuel temperatures on entry to the combustor at cruise conditions may be defined as an average over at least 5 minutes, and optionally over ten minutes, under steady state cruise conditions. The use of average temperatures avoids the temperature measurement being unduly skewed by any transient spikes in temperature, which may be defined as fluctuations in temperature of the fuel during operation, often elevation of the temperature. Each fluctuation may not last more than 5 minutes. A fuel temperature of at least 135° C. on entry to the combustor at cruise conditions therefore requires the fuel temperature to remain at or above 135° C. over a period of time, and a brief transient spike to a temperature above 135° C. is not sufficient.

The method may comprise transferring heat to the fuel before the fuel enters the combustor so as to lower the fuel viscosity to a maximum of 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm$^2$/s or lower on entry to the combustor at cruise conditions.

Some or all of the heat transferred to the fuel so as to lower its viscosity may come from the oil in the heat exchange system.

Some or all of the heat transferred to the fuel so as to lower its viscosity on entry to the combustor may be transferred to the fuel in the primary fuel-oil heat exchanger.

The fuel delivery system may comprise a recirculation pipe arranged to allow fuel leaving the primary heat exchanger to return to a point on the fuel flow path before the primary heat exchanger. The method may comprise adjusting a proportion of fuel recirculated via the recirculation pipe based on the change in viscosity of the fuel needed before it reaches the combustor.

The fuel which passes through the secondary fuel-oil heat exchanger may not be provided to the combustor, but instead may be used for fueldraulics (or one or more other engine systems) and then returned to an aircraft fuel tank. The heat transferred to the fuel by the primary fuel-oil heat exchanger alone may heat the fuel so as to reduce the fuel viscosity to a value equal to or below 0.58 mm$^2$/s on entry to the combustor at cruise conditions.

According to a sixth aspect there is provided a gas turbine engine for an aircraft, the gas turbine engine comprising:
  a fuel delivery system arranged to provide fuel;
  a combustor arranged to combust at least a proportion of the fuel; and
  a plurality if heat exchangers comprising:
  a primary fuel-oil heat exchanger arranged to have up to 100% of the fuel provided by the fuel delivery system flow therethrough; and
  a secondary fuel-oil heat exchanger arranged to have a proportion of the fuel from the primary fuel-oil heat exchanger flow therethrough, and wherein fuel is arranged to flow from the primary fuel-oil heat exchanger to the secondary fuel-oil heat exchanger and oil is arranged to flow from the secondary fuel-oil heat exchanger to the primary fuel-oil heat exchanger (such that the secondary fuel-oil heat exchanger transfers heat from oil just returned from lubricating and/or cooling the engine to fuel already heated in the primary fuel-oil heat exchanger); and
  wherein the plurality of heat exchangers is arranged to heat the fuel so as to adjust the fuel viscosity to a maximum of 0.58 mm$^2$/s on entry to the combustor at cruise conditions.

The gas turbine engine may further comprise an engine core comprising a turbine, a compressor, the combustor arranged to combust a fuel, and a core shaft connecting the turbine to the compressor.

The gas turbine engine may further comprise a fan located upstream of the engine core and arranged to be driven, directly or indirectly (e.g. via a fan shaft), by rotation of the core shaft.

The gas turbine engine may further comprise one or more pumps, valves, recirculation pipes, and/or bypass pipes to allow flows of oil and/or fuel through and around the primary and/or secondary fuel-oil heat exchanger may have associated therewith to be controlled so as to tailor heat transfer between the oil and fuel.

It is envisaged that all features described for the fifth aspect can equally apply to the sixth aspect.

In addition, any or all features of the first, second, third or fourth aspects may be used in conjunction with features of the fifth and/or sixth aspects.

The features described below may apply to any of the above-described aspects.

In any of the above aspects, the oil may enter the fuel-oil heat exchangers at a higher temperature than the fuel at cruise conditions, such that the fuel-oil heat exchangers are arranged to transfer heat from the oil to the fuel.

The percentage of fuel from the fuel tank flowing through the primary fuel-oil heat exchanger may be greater than the percentage of fuel from the primary heat exchanger flowing through the secondary fuel-oil heat exchanger.

The fuel-oil heat exchangers may be described as forming parts of a heat exchange system. The heat exchange system may be part of a fuel management system, and may be used to adjust fuel temperature.

The fuel may flow through the primary fuel-oil heat exchanger prior to flowing through the secondary fuel-oil heat exchanger.

The primary fuel-oil heat exchanger may be referred to as a main fuel-oil heat exchanger. The majority of the heat transfer between the oil and the fuel may occur in the primary fuel-oil heat exchanger. The primary function of the primary fuel-oil heat exchanger may be to heat the fuel before it is provided to the combustor. At least substantially all of the fuel may pass through the main fuel-oil heat exchanger.

The secondary fuel-oil heat exchanger may be a servo fuel-oil heat exchanger. A portion, but not all, of the fuel leaving the main fuel-oil heat exchanger may be directed to the servo fuel-oil heat exchanger. The servo fuel-oil heat exchanger may increase the temperature of the fuel further, optionally before providing the fuel for use in servo mechanisms of the gas turbine engine (e.g. for fueldraulic actuation and/or heating). These servo mechanisms may include a nacelle anti-icing system. The servo mechanisms may include engine actuators. The servo mechanisms may include one or more turbine case cooling servo valves. Only fuel which has passed through the secondary fuel-oil heat exchanger may be used in these auxiliary systems. The fuel used in these systems may be returned to a fuel tank for later re-circulation, or may be recombined with other fuel leaving the main fuel-oil heat exchanger and enter the combustor.

The fuel which passes through the secondary fuel-oil heat exchanger therefore may not be provided to the combustor in some implementations, but instead used for fueldraulics and then returned to an aircraft fuel tank.

At least a portion of the fuel may not pass through the secondary fuel-oil heat exchanger. At least a portion of the fuel may not pass through the primary fuel-oil heat exchanger. A bypass route may be provided for one or each heat exchanger, to allow a portion of the fuel to bypass that heat exchanger. The portion of the fuel which bypasses the secondary fuel-oil heat exchanger may be larger than the portion of the fuel which bypasses the primary fuel-oil heat exchanger.

In particular in examples in which fuel which fuel passing through the secondary fuel-oil heat exchanger is returned to a tank rather than provided to the combustor, the proportion of fuel leaving (or bypassing) the primary fuel-oil heat exchanger which avoids the secondary fuel-oil heat exchanger may be larger than the proportion flowing through the secondary fuel-oil heat exchanger, optionally by a factor of at least three.

A portion of fuel may be directed through the secondary fuel-oil heat exchanger by any suitable means, such as one or more valves or the like.

Approximately between 10% and 30% of the fuel beyond the primary fuel-oil heat exchanger (i.e. of the fuel which has passed through or bypassed the primary fuel-oil heat exchanger) may be delivered to the secondary fuel-oil heat exchanger. This may be described as between 10% and 30% of the fuel on the main fuel path upstream of the secondary fuel-oil heat exchanger. For example, approximately between 10% and 20% of the fuel may be delivered to the secondary fuel-oil heat exchanger. Approximately between 13% and 17% of the fuel may be delivered to the secondary fuel-oil heat exchanger. As such, more of the fuel generally flows from the primary heat exchanger to the combustor without flowing through the secondary heat exchanger than flows through the secondary heat exchanger. The flow path from the primary heat exchanger to the combustor may therefore be described as a main fuel flow path, with a proportion of the fuel being diverted off that path to flow through the secondary fuel-oil heat exchanger, and optionally some or all of that proportion returned to the main fuel flow path before the combustor.

Approximately 0-40% of the fuel may pass through the secondary fuel-oil heat exchanger. Approximately 0-10%, 20-30%, 20-40%, or 30-40% of the fuel may pass through the secondary fuel-oil heat exchanger. In other examples, a higher proportion of fuel may pass through the secondary fuel-oil heat exchanger.

A fixed portion of fuel may pass through the secondary fuel-oil heat exchanger. Alternatively, a variable portion of fuel may pass through the secondary fuel-oil heat exchanger.

A ratio of the heat transfer from the oil to the fuel for the primary and secondary fuel-oil heat exchangers may be approximately between 70:30 and 90:10. The primary fuel-oil heat exchanger may therefore be responsible for 70-90% of the heat transfer—it may be referred to as "primary" due to being responsible for most of the heat transfer, i.e. being the primary source of heat for heating the fuel before entry to the combustor, as well as due to being the first fuel-oil heat exchanger to be reached by the fuel.

A ratio of the heat transfer from the oil to the fuel for the primary and secondary fuel-oil heat exchangers may be approximately 80:20.

In other examples, the ratio of the heat transfer from the oil to the fuel for the secondary fuel-oil heat exchanger may be higher.

The oil may flow through the secondary fuel-oil heat exchanger prior to flowing through the primary fuel-oil heat exchanger. The oil may not flow through any other components (except pipes) between the secondary fuel-oil heat exchanger and the primary fuel-oil heat exchanger—as such, the temperature of the oil flowing through the secondary fuel-oil heat exchanger may be higher than the temperature of the oil flowing through the primary fuel-oil heat exchanger at cruise.

The fuel may flow through the primary fuel-oil heat exchanger prior to flowing through the secondary fuel-oil heat exchanger.

The fuel delivery system may comprise a pump located downstream of the primary fuel-oil heat exchanger and upstream of the secondary fuel-oil heat exchanger.

In light of the above, it will be appreciated that the fuel exiting the secondary fuel-oil heat exchanger is generally hotter than the fuel exiting the primary fuel-oil heat exchanger. The fuel exiting the secondary fuel-oil heat exchanger may be delivered to the combustor, or may be returned to a fuel tank (optionally via fueldraulic components, or other fuel-using systems), rather than being passed to a pump and then optionally recirculated, for example. This reduces the flow path length and time spent with the fuel at its highest temperature during the fuel delivery process within the engine (noting that the fuel will cool on mixing with cooler fuel in a fuel tank), reducing temperature losses to the environment. Further, the shorter fuel path for the hotter fuel within the engine may reduce the number of components which are interacted with by the fuel at its highest temperature, which may improve component longevity.

Further, the placement of the fuel pump between the primary and secondary fuel-oil heat exchangers may assist in preserving the life of the fuel pump. The temperature of the fuel may be elevated on exiting the primary heat exchanger, and yet further elevated on exiting the secondary heat exchanger. The placement of the fuel pump between the two, and more specifically before the secondary heat exchanger, reduces the exposure of the fuel pump to the highest temperature fuel flow, and therefore reduces the damage associated with these high temperatures. The reduced maximum temperature to which the pump is exposed may reduce creep, reduce deposition of thermal decomposition products of the fuel within the pump (which can result in blockages, so resulting in deterioration in delivery flow over the life of the pump), reduce thermal damage to components such as seals, and/or reduce damage over cycling resulting from different thermal expansions of different pump components, so extending pump life/improving pump performance for a given pump age. In addition, bearing film thickness in the pump may be improved if temperatures of fuel in the pump are kept lower by placing the pump before a further heat exchanger. Fuel is the lubricant for the pump bearings, and fuel viscosity generally reduces as temperature increases, so deleteriously reducing film thickness. Reducing the fuel temperature may result in an increase in the viscosity of the fuel, which generally enhances the performance of the bearing surfaces inside the pump, so reducing wear and hence reducing deterioration in flow delivery with time. In addition, lower fuel temperatures generally reduce the formation of fuel breakdown products which also have a detrimental effect on the life and reliability of the pump. Reducing the fuel temperature may result in an increase in the viscosity of the fuel, which generally enhances the performance of the bearing surfaces inside the pump, so reducing wear and hence reducing deterioration in flow delivery with time. In addition, lower fuel temperatures generally reduce the formation of fuel breakdown products which also have a detrimental effect on the life and reliability of the pump. The lower fuel temperature may therefore also increase pump reliability. The lower temperature may also reduce damage to journal bearings and thrust bearings. Other relevant factors include variation in cavitation (cooler fuel is denser and has a lower vapour pressure) and lubricity; cooler fuel is beneficial from the volumetric pump output perspective, so a pump may be kept on-wing longer/may have a longer useful lifespan if used with cooler fuel. However, increasing the fuel temperature may provide benefits such as improved combustion in some implementations, and a suitable balance may therefore be selected—heat exchange between oil and fuel may therefore be adjusted as appropriate to achieve the desired characteristics at cruise.

The gas turbine engine may form part of an aircraft. The aircraft may comprise a fuel tank, and a fuel supply pump configured to supply a flow of fuel to the fuel management system of the engine itself. The fuel supply pump may be described as a fuel tank pump or a low pressure pump, and may be located upstream of the engine, and therefore upstream of the primary fuel-oil heat exchanger.

The fuel pump of the fuel management system may be described herein as a main fuel pump or engine fuel pump, as, unlike the fuel supply pump, it is a part of the engine itself. The main fuel pump may be located downstream of the primary fuel-oil heat exchanger. The main fuel pump may be located upstream of the inlet to the secondary fuel-oil heat exchanger. One or more auxiliary fuel pumps may be located at any suitable position along the fuel flow path.

As discussed above, at least a portion of the fuel flowing through the secondary fuel-oil heat exchanger may be provided to servo mechanisms of the aircraft. At least a portion of this fuel may then be returned to an aircraft fuel tank or to the low pressure pump for recirculation.

Alternatively or additionally, at least a portion of the fuel flowing through the secondary fuel-oil heat exchanger may be returned to any earlier point on the fuel flow path; for example back to the inlet of the primary or secondary fuel-oil heat exchanger.

In some example implementations, a third, fourth or any suitable number of further fuel-oil heat exchangers may be present, optionally with a fuel valve operable to control a flow rate of fuel therethrough.

Oil flow within the gas turbine engine may follow a closed loop. Oil may be used for lubrication and/or cooling. The closed loop oil system may be configured to supply a recirculating flow of oil within the engine and may be described as a recirculating lubrication and/or cooling system, or as a recirculating oil system. At least one of the primary and secondary fuel-oil heat exchangers may be described as forming part of the closed loop system. The recirculating lubrication and/or cooling system may be described as an oil heat management system, as heat is removed from the oil after it has been warmed in the process of lubricating and/or cooling other engine components (e.g. shaft bearings).

The closed loop system may comprise at least a first oil pump configured to pump a flow of oil around at least a portion of the recirculating oil system. The first oil pump may be located at any suitable position around the recirculating oil system. The recirculating oil system may be configured such that the flow of oil flows through engine components (e.g. the engine bearing chamber) and may then be collected in a sump. The first oil pump may be configured to pump oil from the sump to a first oil tank. As such, the first oil pump may be described as a scavenge pump.

The oil tank may be suitable for containing a volume of oil. The oil tank may be configured to contain any suitable volume of oil. The oil tank may be arranged to remove gasses from the oil in the first oil tank. Oil leaving the oil tank may pass through a filter, strainer, or the like.

A second oil pump may be located between the first oil tank and the primary or secondary fuel-oil heat exchanger. The second oil pump may be described as a feed pump. The second oil pump may be configured to pump oil from the first oil tank to the primary or secondary fuel-oil heat exchanger.

In some implementations, at least a portion of the oil flows through the primary fuel-oil heat exchanger and at least a portion of the oil flows through the secondary fuel-oil heat exchanger. All of the oil may flow through both the primary and secondary fuel-oil heat exchangers. As discussed above, the oil may first flow through the secondary fuel-oil heat exchanger, and then through the primary fuel-oil heat exchanger, so having the opposite flow route from that of the fuel.

The gas turbine engine may further comprise one or more air-oil heat exchangers. The one or more air-oil heat exchangers may form part of the recirculating oil system. The one or more air-oil heat exchangers may be arranged in flow series with the primary and secondary fuel-oil heat exchangers such that at least a portion of the flow of oil flows through an air-oil heat exchanger prior to entering the primary or secondary fuel-oil heat exchanger, or vice versa. In an example, the oil may flow through secondary fuel-oil heat exchanger before flowing through an air-oil heat exchanger (e.g. a Surface Air Cooled Oil Cooler) and then the primary fuel-oil heat exchanger.

At cruise conditions, and for all aspects of the present invention, the flow of oil entering any of the fuel-oil heat exchangers may have a higher average temperature than the flow of fuel entering the same fuel-oil heat exchanger. In this way, thermal energy may be transferred from the flow of oil to the flow of fuel flowing through the one or more fuel-oil heat exchangers at cruise conditions. As such, oil leaving each heat exchanger may have a lower temperature than the oil entering that heat exchanger at cruise conditions.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high-pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propellor stages may be driven by a gearbox. The gearbox may be of the type described herein.

An engine according to the present disclosure may be a turbofan engine. Such an engine may be a direct-drive turbofan engine in which the fan is directly connected to the fan-drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The respective rows of rotor blades and stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm or 320 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 9. 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1 The bypass duct may be substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45.

Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1520K, 1530K, 1540K, 1550K, 1600K or 1650K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing have the conventional meaning and would be readily understood by the skilled person. Thus, for a given gas turbine engine for an aircraft, the skilled person would immediately recognise each term to refer to an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions. Additionally or alternatively, climb may refer to a nominal point in an aircraft flight cycle between take-off and landing, where a relative increase in altitude is required, which may require an additional thrust demand of the engine.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft. During either or both of descent and approach, the engine may be producing between 20% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Implementations will now be described by way of example only, with reference to the Figures, in which.

DETAILED DESCRIPTION OF THE DISCLOSURE

Figure 1:
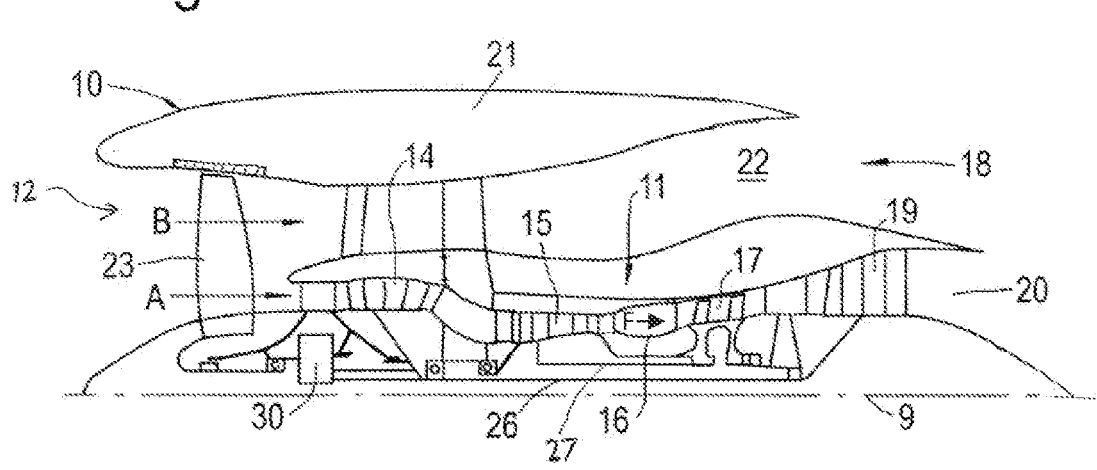
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
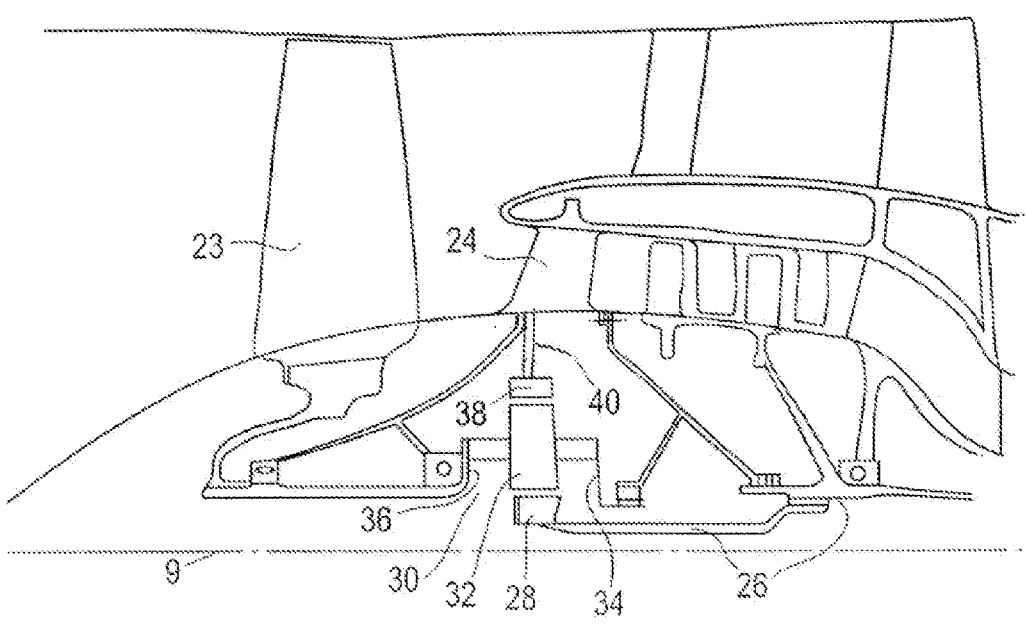
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3A:
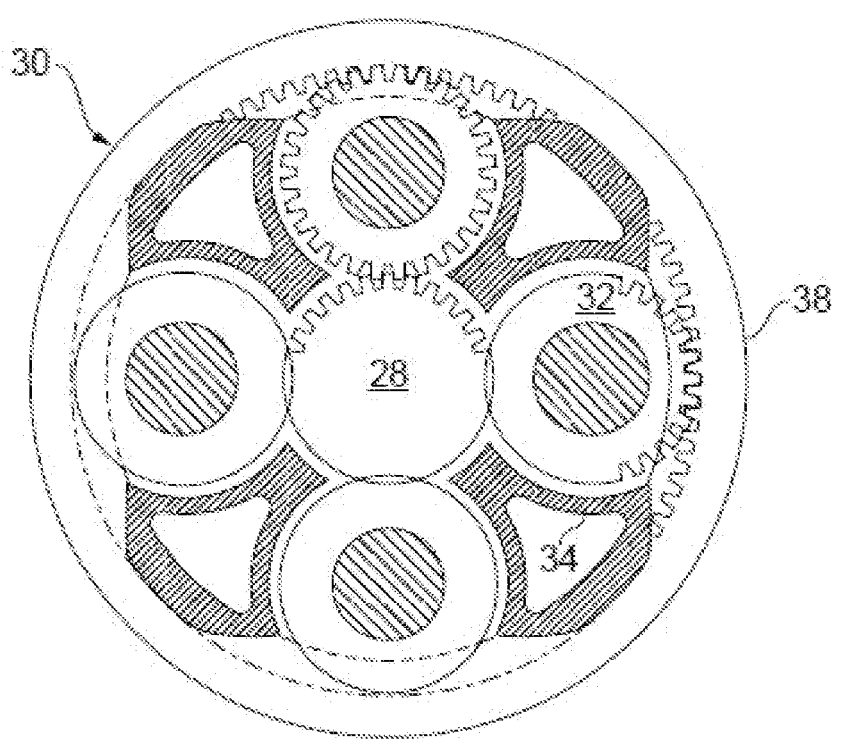
FIG. 3A is a partially cut-away view of a gearbox for a gas turbine engine.

The epicyclic gearbox 30 is shown by way of example in greater detail in FIG. 3A. Each of the sun gear 28, planet gears 32 and ring gear 38 comprise teeth about their periphery to intermesh with the other gears. However, for clarity only exemplary portions of the teeth are illustrated in FIG. 3A. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32. The epicyclic gearbox 30 illustrated by way of example in FIGS. 2 and 3A is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

By way of further example, other gas turbine engines to which the present disclosure may be applied may have no gearbox for the main shaft(s), instead being direct drive engines. A cross-sectional view of one such engine is shown in FIG. 3B.

Figure 3B:
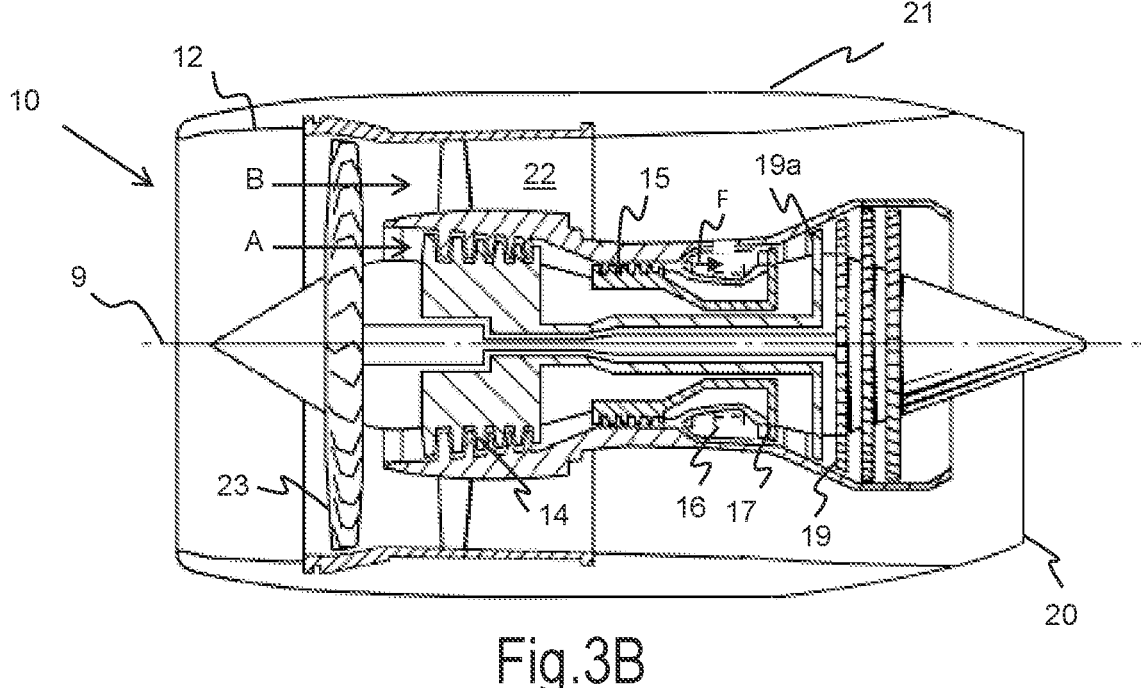
FIG. 3B is a sectional side view of a direct drive gas turbine engine, the direct drive engine not having a gearbox as shown in FIG. 3A.

With reference to FIG. 3B, a gas turbine engine is generally indicated at 10, having a principal rotational axis 9. The engine 10 comprises, in axial flow series, an air intake 12, a propulsive fan 23, an intermediate pressure compressor 14, a high-pressure compressor 15, combustion equipment 16, a high-pressure turbine 17, an intermediate pressure turbine 19a, a low-pressure turbine 19 and an exhaust nozzle 20. A nacelle 21 surrounds the engine 10 and defines both the intake 12 and the exhaust nozzle 20.

In use, air entering the intake 12 is accelerated by the fan 23 to produce two air flows: a core airflow A and a bypass airflow B. The core airflow A flows into the intermediate pressure compressor 14, and the bypass air flow B passes through a bypass duct 22 to provide propulsive thrust. The intermediate pressure compressor 14 compresses the airflow A before delivering that air to the high pressure compressor 15 where further compression takes place.

The compressed air exhausted from the high-pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high, intermediate, and low-pressure turbines 17, 19a, 19 before being exhausted through the nozzle 20 to provide additional propulsive thrust. The high 17, intermediate 19a and low 19 pressure turbines drive respectively the high pressure compressor 15, intermediate pressure compressor 14 and fan 23, each by a suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

Functional performance of a given composition, or blend of fuel for use in a given mission, may be defined, at least in part, by the ability of the fuel to service the Brayton cycle of the gas turbine engine 10. Parameters defining functional performance may include, for example, specific energy; energy density; thermal stability; and, emissions including particulate matter. A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. Thus, in some examples, sustainable aviation fuels may comprise either or both of a density of between 90% and 98% that of kerosene and a calorific value of between 101% and 105% that of kerosene.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 4:
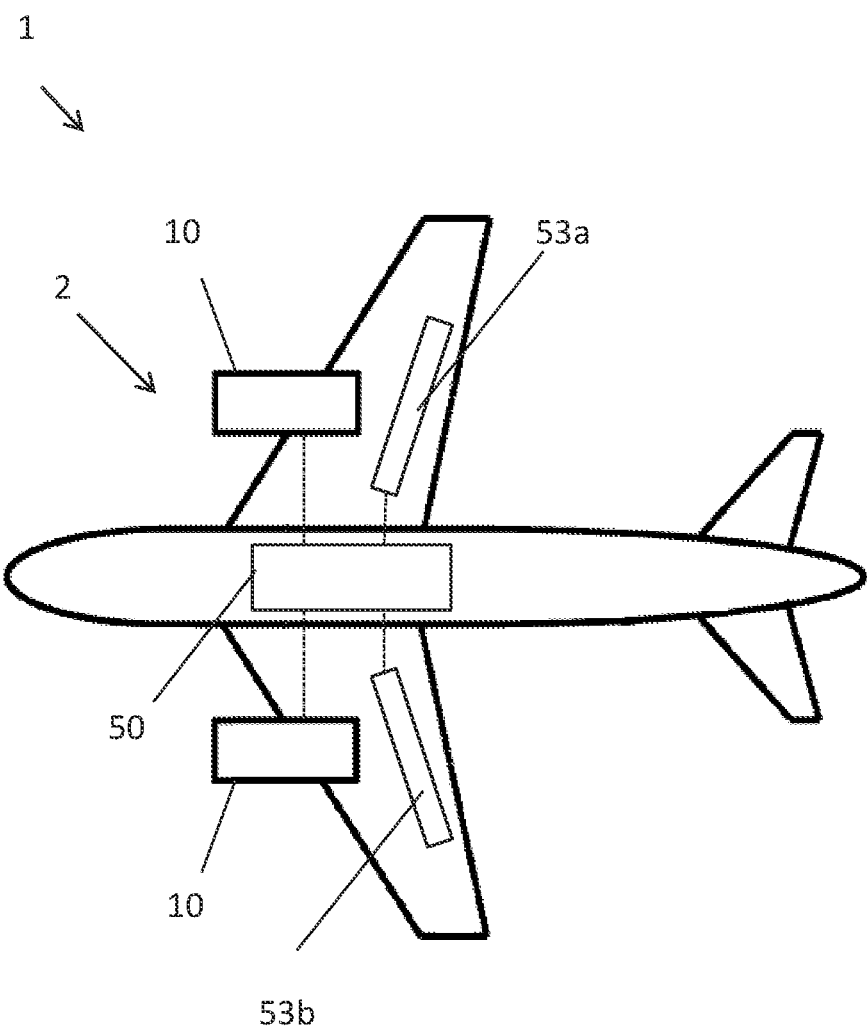
FIG. 4 shows an example aircraft comprising two gas turbine engines.

FIG. 4 shows an aircraft 1 with a propulsion system 2 comprising two gas turbine engines 10. The gas turbine engines 10 are supplied with fuel from a fuel supply system on board the aircraft 1. The fuel supply system of the examples pictured comprises a single fuel source 50, 53.

For the purposes of the present application the term "fuel source" means either 1) a single fuel tank or 2) a plurality of fuel tanks which are fluidly interconnected.

In the present examples, the first (and, in these examples, only) fuel source comprises a centre fuel tank 50, located primarily in the fuselage of the aircraft 1 and a plurality of wing fuel tanks 53a, 53b, where at least one wing fuel tank is located in the port wing and at least one wing fuel tank is located in the starboard wing for balancing. All of the tanks 50, 53 are fluidly interconnected in the example shown, so forming a single fuel source. Each of the centre fuel tank 50 and the wing fuel tanks 53 may comprise a plurality of fluidly interconnected fuel tanks. It will be appreciated that this tank arrangement is provided by way of example only, and is not limiting on the scope of this disclosure.

In alternative examples, the wing fuel tanks 53a, 53b may be fluidly interconnected with each other, but not with the centre fuel tank 50, such that there are two separate fuel sources, which may each be used to contain a different fuel. Three or more fluidly isolated fuel sources may be provided in other examples. A fuel management system as described below may take fuel from one or more of the fuel sources to power the or each engine 10.

Figure 5:
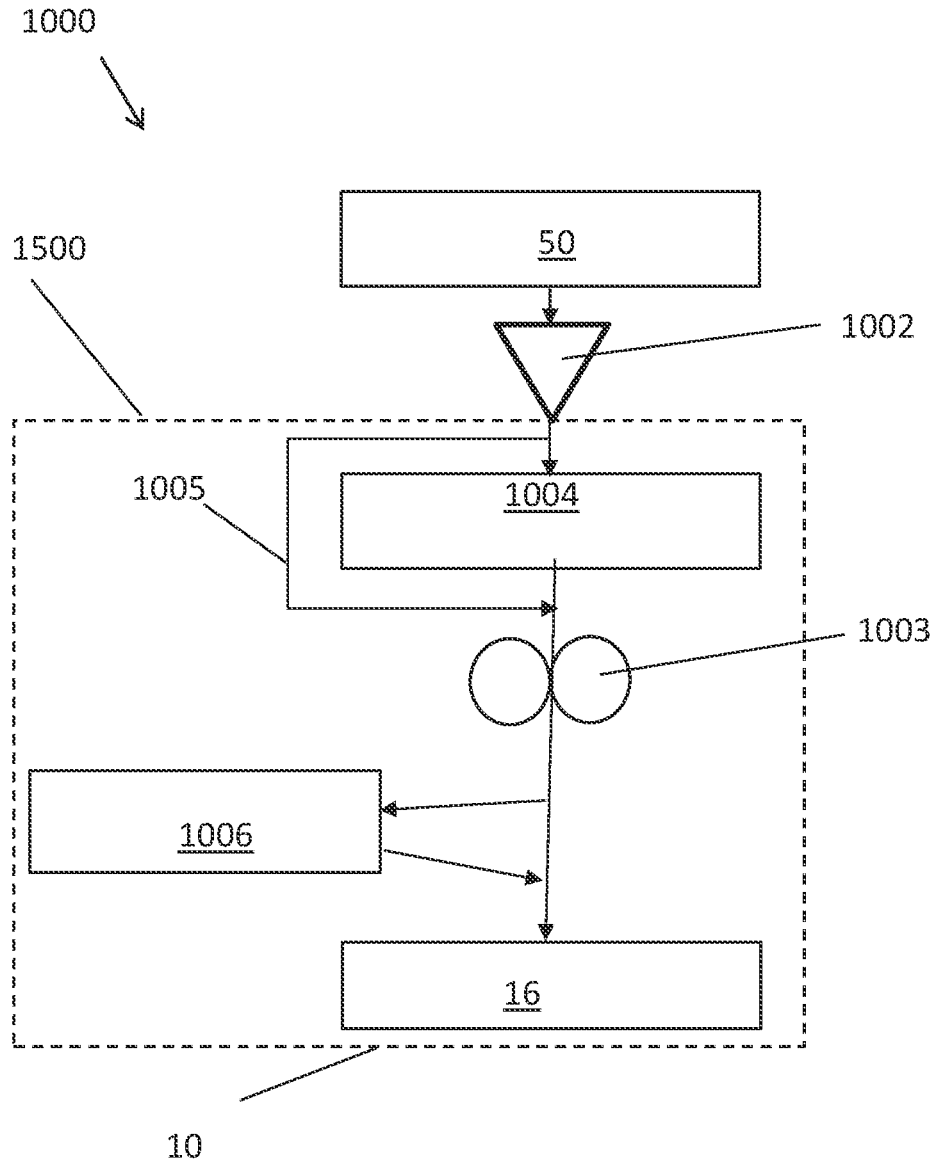
FIG. 5 is a schematic representation of an example fuel system.

An example fuel system 1000 comprising a fuel flow path from the fuel tank 50 to the combustor 16 of a gas turbine engine 10 of the aircraft 1 is shown schematically in FIG. 5. Fuel system 1000 comprises both the fuel supply system (which supplies fuel to the engine 10, and may comprise multiple tanks located remotely from the engine) and the fuel management system 1500 (which operates within the engine 10) of the aircraft 1.

Fuel is pumped from the fuel tank 50 to the gas turbine engine 10 by a low pressure fuel supply pump 1002. The fuel then flows through a primary fuel-oil heat exchanger 1004 before being pumped by an engine fuel pump 1003. The engine fuel pump 1003 may be described as a main fuel pump. At least a portion of the fuel then flows through a secondary fuel-oil heat exchanger 1006 and at least a portion of the fuel flows to the combustor 16 without flowing through the secondary fuel-oil heat exchanger 1006.

In the example shown in FIG. 5, from the secondary fuel-oil heat exchanger 1006 the portion of fuel that flowed therethrough then flows to the combustor 16 of the gas turbine engine 10, re-joining fuel which flowed through the primary fuel-oil heat exchanger 1004 only. In alternatives, such as that shown in FIG. 6B (described below), the portion of fuel that flows through the secondary fuel-oil heat exchanger 1006 may be used in one or more auxiliary systems and then returned to a tank 50, 53 rather than being delivered to the combustor 16.

The primary fuel-oil heat exchanger 1004 may be described as a main fuel-oil heat exchanger. The secondary fuel-oil heat exchanger 1006 may be described as a servo fuel-oil heat exchanger. The fuel management system 1500 is arranged so that the fuel reaches the primary fuel-oil heat exchanger 1004 before the secondary fuel-oil heat exchanger 1006.

The primary fuel-oil heat exchanger 1004 and the secondary fuel-oil heat exchanger 1006 are configured such that a flow of oil is also conveyed therethrough. The primary fuel-oil heat exchanger 1004 and secondary fuel-oil heat exchanger 1006 are configured such that heat may be transferred between the oil and the fuel flowing therethrough. At cruise conditions, the average temperature of the flow of oil entering the primary fuel-oil heat exchanger 1004 and the secondary fuel-oil heat exchanger 1006 is higher than the average temperature of the fuel entering the primary fuel-oil heat exchanger 1004 and the secondary fuel-oil heat exchanger 1006 respectively. In this way, the primary fuel-oil heat exchanger 1004 and the secondary fuel-oil heat exchanger 1006 are each configured to transfer thermal energy from a flow of oil to a flow of fuel flowing therethrough at cruise conditions.

Figure 7:
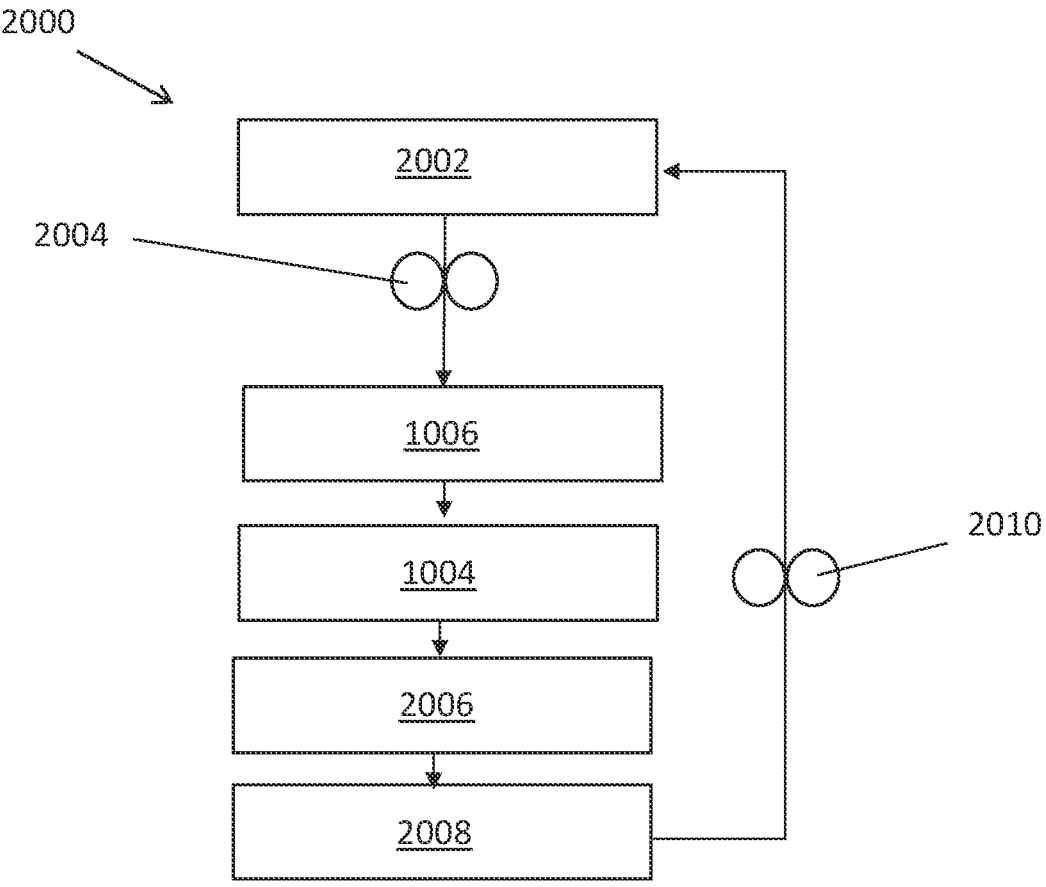
FIG. 7 is a schematic representation of a portion of an example recirculating oil system.

In the arrangement of the fuel management system 1500, the oil flows through the secondary fuel-oil heat exchanger 1006 prior to flowing through the primary fuel-oil heat exchanger 1004 (as shown in FIG. 7, described below). In the example currently being described, the oil does not gain any heat between leaving the secondary fuel-oil heat exchanger 1006 and entering the primary fuel-oil heat exchanger 1004, so the oil is hotter on entry to the secondary fuel-oil heat exchanger 1006 than on entry to the primary fuel-oil heat exchanger 1004. By contrast, the fuel flows through the primary fuel-oil heat exchanger 1004 prior to flowing through the secondary fuel-oil heat exchanger 1006. In this arrangement, the fuel temperature exiting the secondary fuel-oil heat exchanger 1006 is higher than the fuel temperature exiting the primary fuel-oil heat exchanger 1004. The engine fuel pump 1003 is located upstream of the secondary fuel-oil heat exchanger 1006, meaning it is not exposed to these further elevated fuel temperatures.

The oil may flow through an air-oil heat exchanger (not shown) as well as through the primary and secondary fuel-oil heat exchangers 1004, 1006 if further heat loss from the oil is desired, beyond that to be taken by the fuel. For example, the oil may pass through the air-oil heat exchanger after passing through the secondary fuel-oil heat exchanger 1006 and before entering the primary fuel-oil heat exchanger 1004. The air-oil heat exchanger may be the only component (pipes aside) through which the oil passes between the secondary fuel-oil heat exchanger 1006 and the primary fuel-oil heat exchanger 1004. No air-oil heat exchanger may be provided in other examples. The oil may be returned to the bearings and/or other engine components it is used to lubricate and/or cool after leaving the primary heat exchanger 1004. The oil may be returned to an oil tank 2002, as described below, after leaving the primary heat exchanger 1004, or optionally after leaving the bearings and/or other engine components it is used to lubricate and/or cool, before then being returned to the secondary heat exchanger 1006.

In the arrangement of the fuel management system 1500 shown in FIG. 5, the fuel management system 1500 also comprises a bypass pipe 1005 arranged to allow a portion of the fuel from the tank 50 to bypass the primary fuel-oil heat exchanger 1004. This may be used to control heat transfer within the system 1500, as described in more detail below.

Figure 6A:
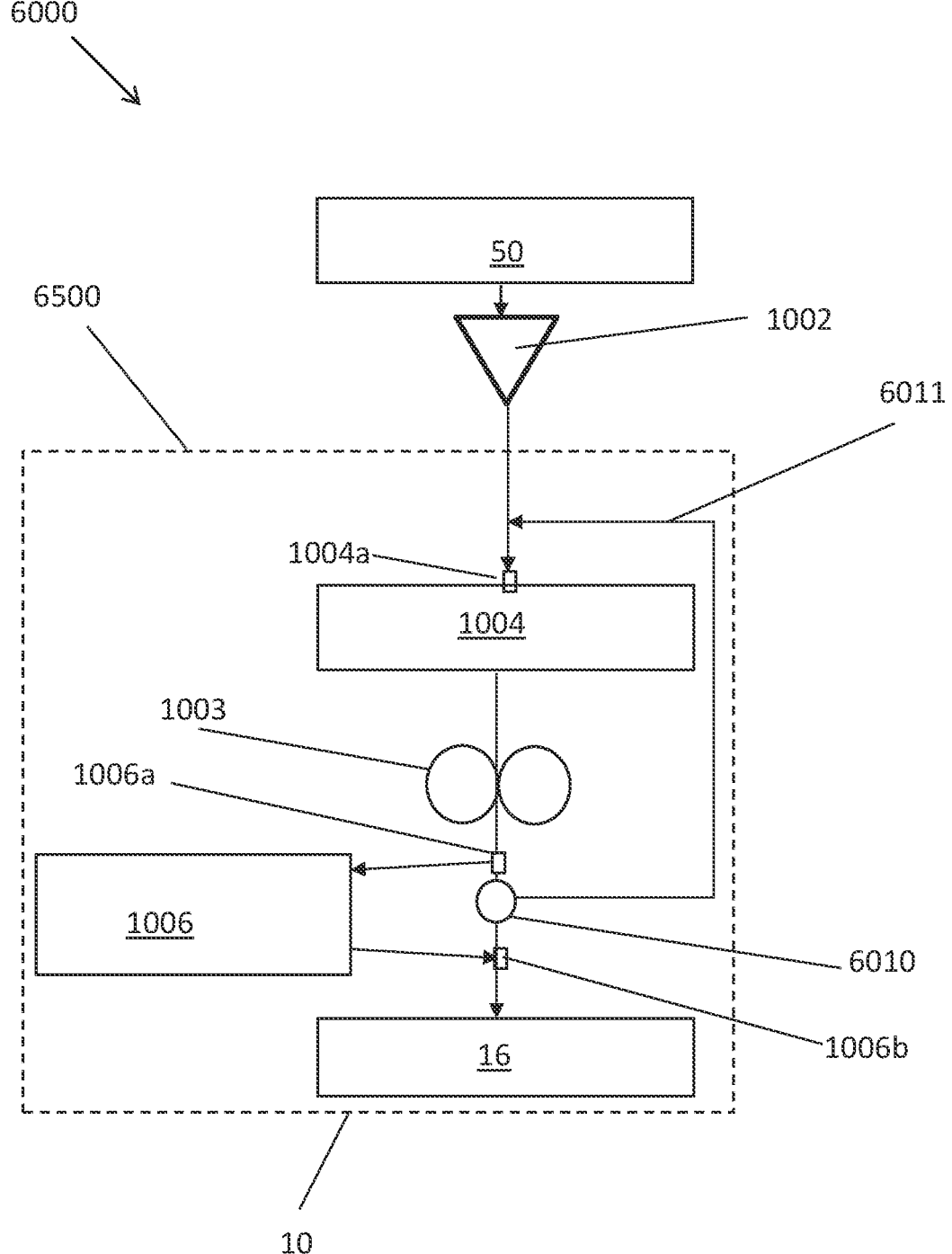
FIG. 6a is a schematic representation of an alternative example fuel system.

FIG. 6a shows an alternative example fuel delivery system 6000 like that 1000 described above but with an additional fuel recirculation loop. This alternative example fuel system 6000 comprises a fuel supply system and fuel management system 6500 comprising a fuel flow path from the fuel tank 50 to the combustor 16 of the gas turbine engine 10 of the aircraft 1. As with fuel system 1000, fuel is pumped from the fuel tank 50 by the low pressure fuel supply pump 1002. The fuel then flows through a primary fuel-oil heat exchanger 1004 before passing through an engine fuel pump 1003. The engine fuel pump 1003 may be described as a main fuel pump.

Fuel system 6000 differs from the fuel system 1000 described above in that fuel system 6000 comprises a recirculation valve 6010 located downstream of the primary fuel-oil heat exchanger 1004 and, in the example shown, upstream of an outlet 1006b of the secondary fuel-oil heat exchanger 1006 where fuel from that heat exchanger re-joins the main fuel flow path. In the illustrated example, the recirculation valve 6010 is located downstream of the pump 1003.

In the illustrated example, the recirculation valve 6010 is located downstream of the inlet 1006a of the secondary fuel-oil heat exchanger 1006, but upstream of the outlet 1006b. It is envisaged that the recirculation valve 6010 could be located upstream of the inlet 1006a of the secondary heat exchanger 1006 in other examples, and we note that there may be no outlet of the secondary heat exchanger 1006 back to the main fuel flow path to the combustor 16 in some examples. The recirculation valve 6010 is arranged to allow a controlled amount of fuel which has passed through the primary heat exchanger 1004 but not passed through the secondary heat exchanger 1006 to be returned to the inlet 1004a of the primary heat exchanger 1004. This provides a mechanism of controlling the fuel flow of the fuel system 6000, returning fuel which has passed through the pump 1003 to a position on the flow path before the pump 1003. Controlling the fuel flow in the fuel system 6000 can work to provide desired characteristics of the fuel (such as temperature and flow rate) on entry to the combustor 16. In particular, fuel flow rate to the combustor 16 can be adjusted without changing speed of the pump 1003 if the proportion recirculated is varied—this may be of particular utility in implementations in which pump speed is directly linked to shaft speed of the engine, so allowing variation of flow rate to the combustor 16 at a given pump speed. In implementations in which fuel which flows through the secondary heat exchanger 1006 is not returned to the combustor 16, changing a proportion of fuel sent to that heat exchanger 1006 may also be used to control fuel flow rate into the combustor 16.

A pipe 6011 may therefore be provided, leading from the recirculation valve 6010 to a point on the flow-path upstream of the inlet 1004a to the primary heat exchanger 1004. The pipe 6011 may also be referred to as a recirculation pipe, as it is used to allow fuel to recirculate through the primary heat exchanger 1004 and optionally also through the pump 1003. In the illustrated example, the recirculation pipe 6011 returns the recirculated fuel to a point on the flow-path upstream of both the main pump 1003 and the primary heat exchanger 1004, such that the recirculated fuel passes through those components at least twice.

Figure 6B:
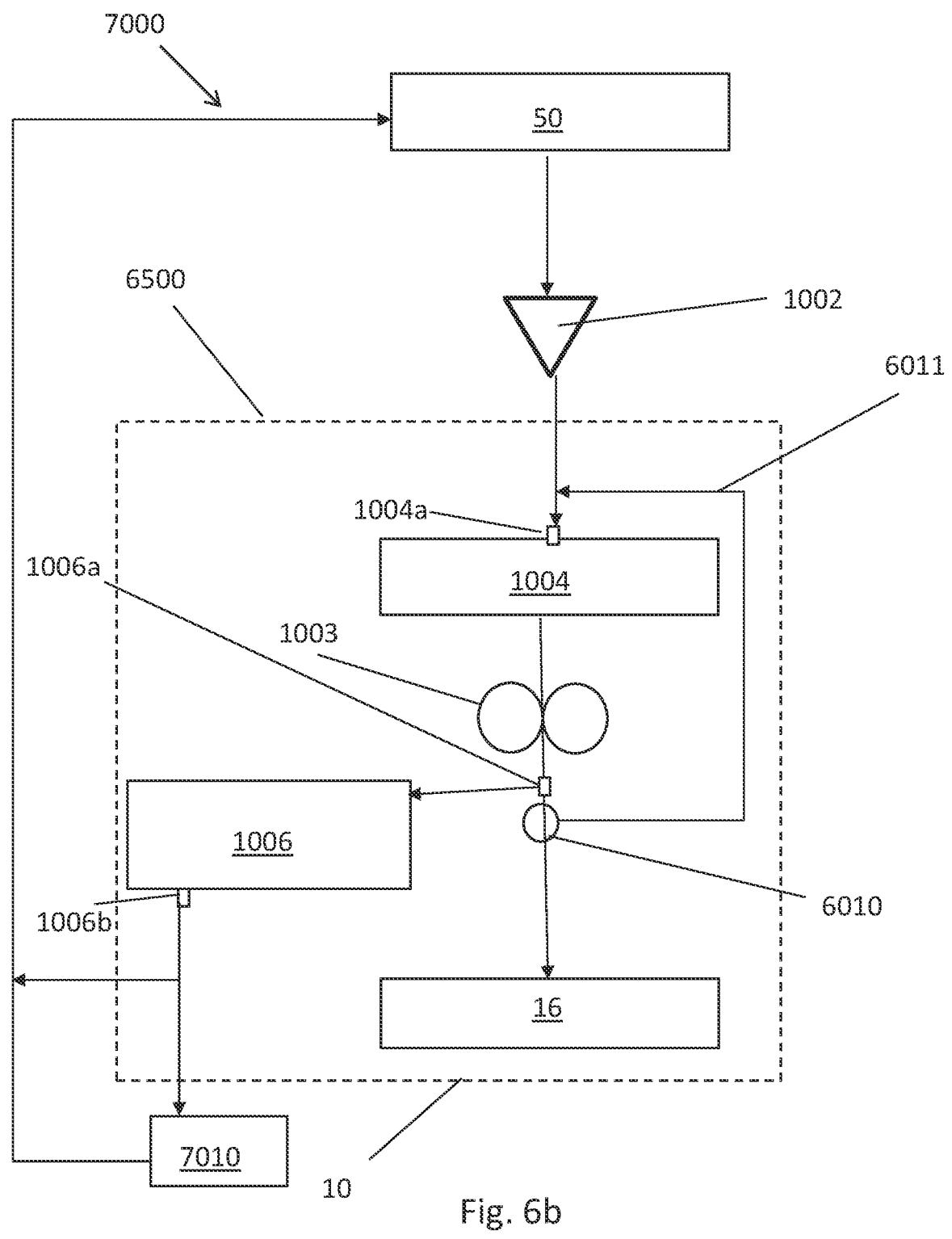
FIG. 6b is a schematic representation of a further alternative example fuel system similar to that shown in FIG. 6a but in which fuel passing through the secondary heat exchanger is not sent to the combustor.

FIG. 6B illustrates an alternative example fuel system 7000. The fuel system 7000 is similar to the fuel system 6000 described above, but differs in that at least a portion of the fuel exiting the secondary fuel-oil heat exchanger 1006 is supplied to additional aircraft mechanisms 7010, rather than (directly) to the combustor 16. These mechanisms 7010 may include one or more of a nacelle anti-icing system, actuators, and/or turbine case cooling (TCC) systems. At least a portion of the fuel exiting the secondary fuel-oil heat exchanger 1006 is returned to the fuel supply system (i.e. the fuel tank 50 or the fuel supply pump 1002) for redistribution. In the implementation shown, all of the fuel passing through the secondary fuel-oil heat exchanger 1006 is returned to the fuel supply system rather than being passed to the combustor 16.

Figure 6C:
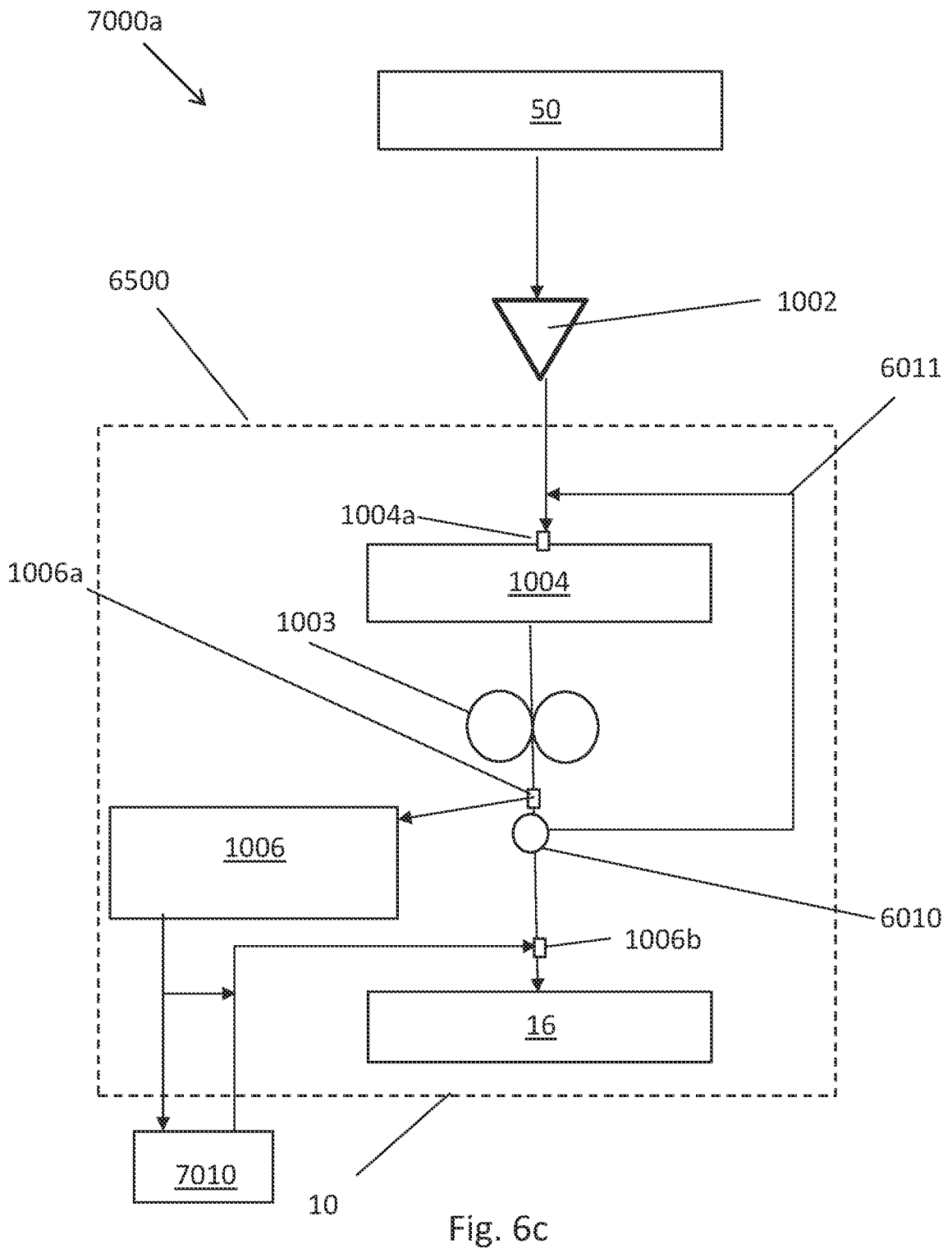
FIG. 6c is a schematic representation of a further alternative example fuel system similar to that shown in FIG. 6b but in which fuel passing through the secondary heat exchanger is returned to the combustor optionally after being used in one or more auxiliary systems.

FIG. 6c illustrates a further alternative example fuel system 7000a. The fuel system 7000a is similar to fuel system 7000 and differs in that the portion of the fuel exiting the secondary fuel-oil heat exchanger 1006 returned to join the main fuel flow on its approach to the combustor 16 after optionally being supplied to one or more additional aircraft mechanisms 7010 (which may be as described above). Any fuel not needed for these auxiliary systems 7010 may be returned straight to the main fuel flow path/combustor 16. At least a portion of the fuel exiting the secondary fuel-oil heat exchanger 1006 may be returned to the main fuel flow path without passing through the auxiliary systems 7010—the proportion directed to the auxiliary systems 7010 may be adjusted based on need. In other implementations, fuel used in one or more such additional aircraft mechanisms 7010 may then be returned to a tank 50 rather than sent to the combustor 16.

In the various examples described above, the aircraft 1 comprises a recirculating oil system 2000 arranged to supply oil to lubricate and/or remove heat from a plurality of components. The recirculating oil system comprises one closed loop oil system, and may consist of a single closed loop in some implementations. An example of a closed loop oil system 2000 is shown schematically in FIG. 7.

The closed loop oil system 2000 comprises an oil tank 2002 suitable for containing a volume of oil. In some implementations, gasses are removed from oil within the oil tank 2002 by a de-aerator.

A feed pump 2004 is configured to pump oil from the oil tank 2002 to the secondary fuel-oil heat exchanger 1006. The average temperature of the oil entering the secondary fuel-oil heat exchanger 1006, at cruise conditions, is higher than the average temperature of fuel entering the secondary fuel-oil heat exchanger 1006. In the secondary fuel-oil heat exchanger 1006, thermal energy is transferred from the flow of oil to the flow of fuel. In this way, the average temperature of the flow of oil leaving the secondary fuel-oil heat exchanger 1006 is lower than the average temperature of the flow of oil entering the secondary fuel-oil heat exchanger 1006. Also in this way, the average temperature of the fuel leaving the secondary fuel-oil heat exchanger 1006 is higher than the average temperature of fuel entering the secondary fuel-oil heat exchanger 1006.

From the secondary fuel-oil heat exchanger 1006 the oil then flows to the primary fuel-oil heat exchanger 1004. In the primary fuel-oil heat exchanger 1004, thermal energy is transferred from the flow of oil to the flow of fuel. In this way, the average temperature of the flow of oil leaving the primary fuel-oil heat exchanger 1004 is lower than the average temperature of the flow of oil entering the primary fuel-oil heat exchanger 1004. Also in this way, the average temperature of the fuel leaving the primary fuel-oil heat exchanger 1004 is higher than the average temperature of fuel entering the primary fuel-oil heat exchanger 1004. From the primary fuel-oil heat exchanger 1004, the flow of oil is then conveyed through the engine components 2006. The oil acts as a lubricant and a coolant within the engine components 2006 and gains heat from the engine components 2006 during the process.

From the engine components 2006, the oil collects in the sump 2008. A scavenge pump 2010 is configured to pump oil from the sump 2008 back into the oil tank 2002.

Figure 8:
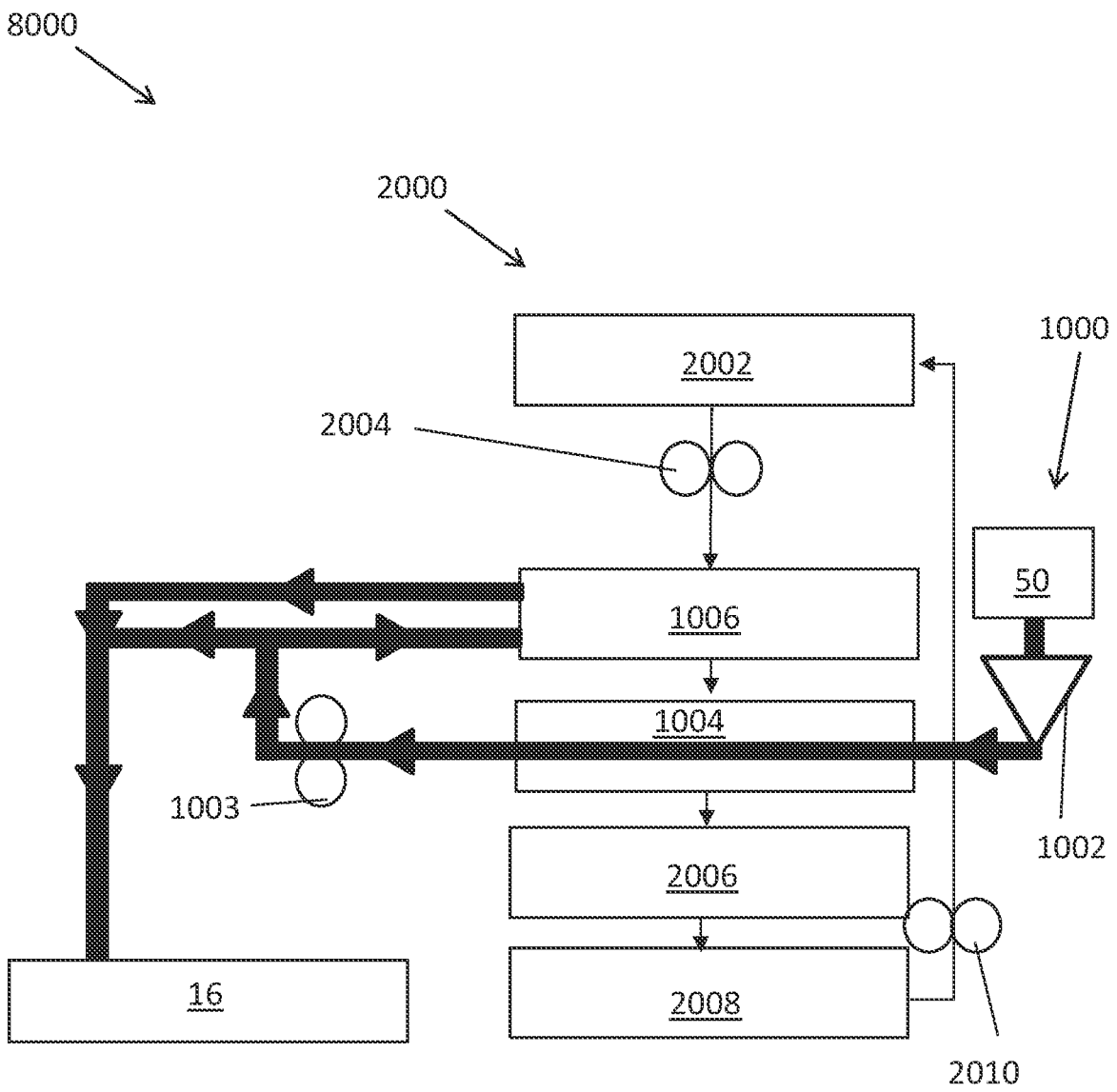
FIG. 8 is a schematic representation of a portion of the example fuel system of FIG. 5 and the example recirculating oil system of FIG. 7.

FIG. 8 shows schematically an example heat exchange system 8000 comprising the closed loop oil system 2000 and the fuel delivery system 1000. The two systems 1000, 2000 are pictured together to illustrate the interactions between the fuel and oil flows within the gas turbine engine 10. The systems 1000, 2000 are at least substantially the same as those illustrated in FIGS. 5 and 7 respectively. The fuel flow is shown with thick black arrows and the oil flow with thin black arrows.

Figure 9:
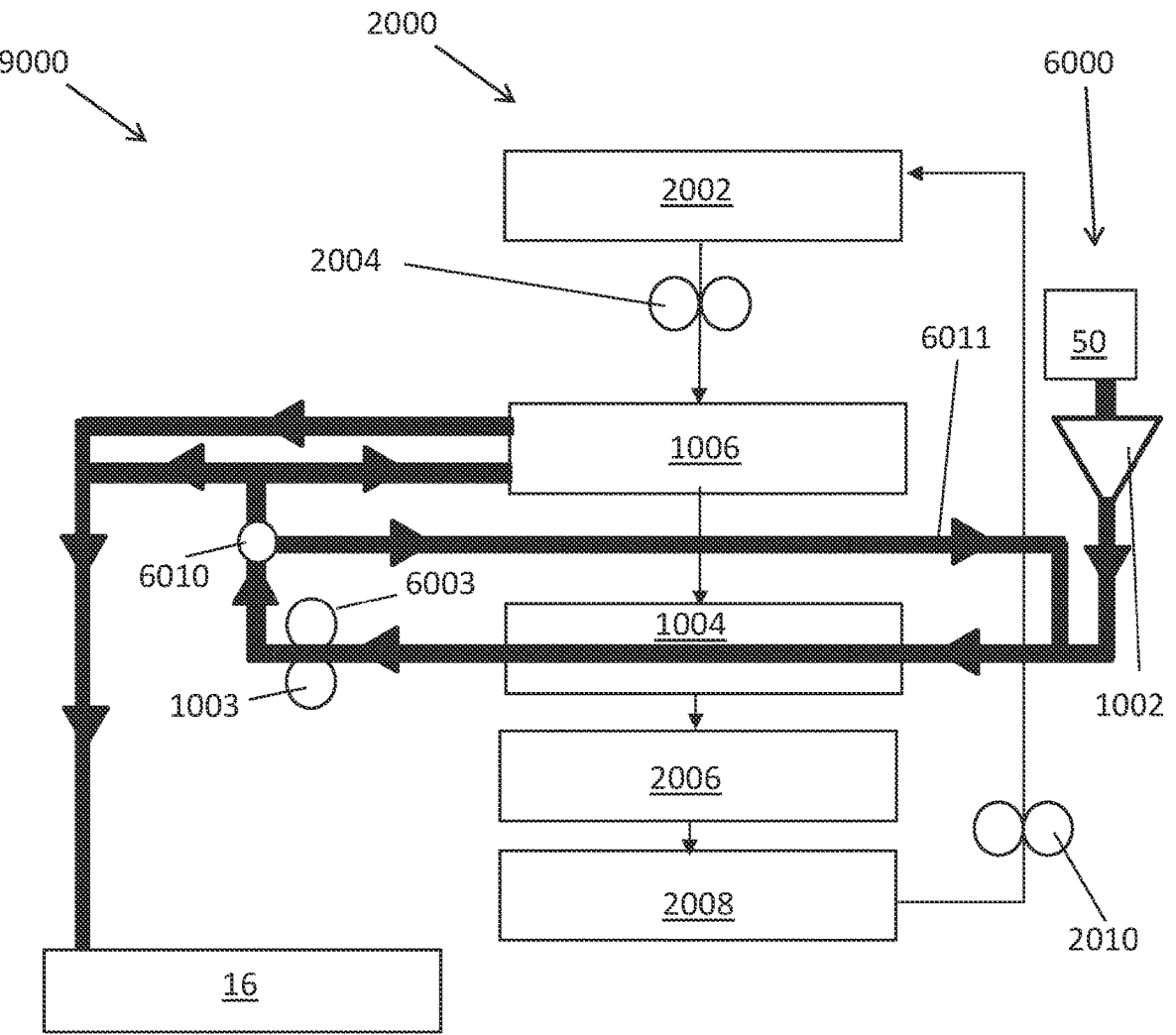
FIG. 9 is a schematic representation of a portion of the example fuel system of FIG. 6c and the example recirculating oil system of FIG. 7.

FIG. 9 shows schematically an alternative example heat exchange system 9000, comprising the closed loop oil system 2000 and the fuel delivery system 7000a. The systems 7000a, 2000 are substantially the same as those illustrated in FIGS. 6C and 7 respectively, with the fuel flow again shown with thick black arrows and the oil flow with thin black arrows. However, the recirculating valve 6010 is located slightly differently from in FIG. 6C, namely being upstream of the fork in the fuel flow path to the secondary heat exchanger 1006, rather than being between the inlet to 1006a and outlet from 1006b that heat exchanger 1006. Thus in the implementation shown in FIG. 9, all of the fuel exiting the pump 1003 flows through the recirculation valve 6010, unlike in the embodiment shown in FIG. 6B. Control methodology for the valve 6010 may be adjusted as appropriate.

It will be appreciated that in implementations such as that shown in FIG. 6B, in which fuel flowing through the secondary fuel-oil heat exchanger 1006 is used as a working fluid in auxiliary systems and then returned to a tank 50, 53 instead of passed to the combustor 16, the fuel flow line to the combustor 16 may be replaced with a fuel flow line back to the tank 50.

The inventors have appreciated that a higher calorific value fuel may be used effectively in an engine 10 as described herein, adjusting operation of the fuel delivery system and/or heat exchange system as appropriate. Higher calorific value of a fuel reduces the required fuel burn rate for a given aircraft speed at cruise conditions, so fuel may be wasted if engine operation is not adjusted.

Figure 10:
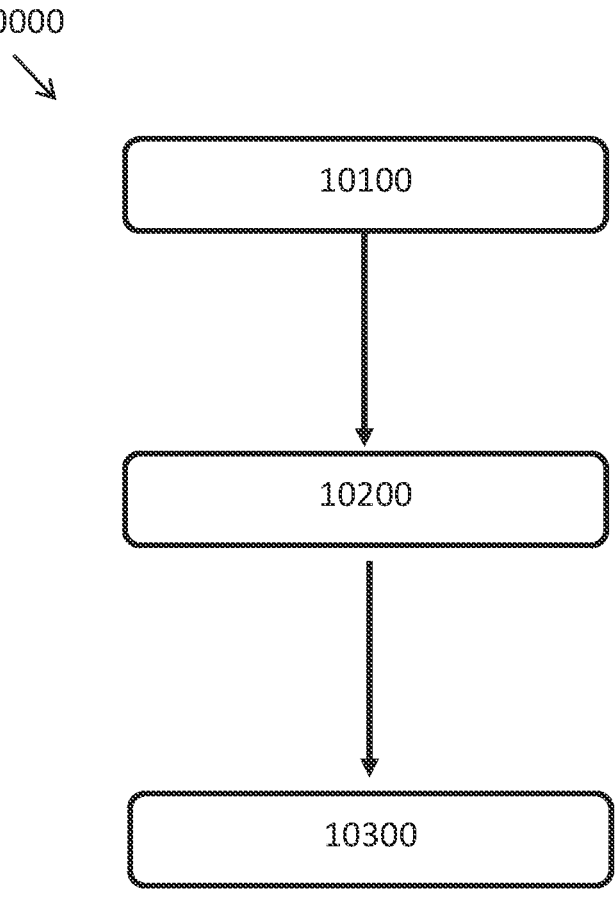
FIG. 10 illustrates an example method of operating a gas turbine engine.

FIG. 10 illustrates an example method 10000 of operating a gas turbine engine 10. The method 10000 comprises the steps of:

Step 10100: Obtaining a fuel, wherein the calorific value of the fuel provided to the gas turbine engine 10 is at least 43.5 MJ/kg, and optionally between 43.5 MJ/kg and 44 MJ/kg.

Obtaining the fuel may comprise selecting a single fuel. Obtaining the fuel may alternatively comprise selecting a fuel mixture. The selected fuel may be the only fuel on board of the aircraft. As such, the selection of the fuel may be performed during refuelling of the aircraft, prior to take-off. Alternatively, the selected fuel may be one of several fuels on board the aircraft, or a mixture of multiple fuels on board the aircraft. As such, the selection of the fuel may be performed during flight. The selection process may be automated. For example, an onboard controller may be configured to select and/or mix fuel(s) stored in one or more fuel tanks 50, 53 in order to provide a fuel with the desired calorific value. The controller may store the calorific values and tank locations for the fuels on board and calculate the ratio of fuel mixing (which may include no mixing of fuels) in order to provide a fuel with the desired calorific value.

Step 10200: Conveying up to 100% of the selected fuel (which may be a fuel mixture) from the one or more fuel tanks through the primary fuel-oil heat exchanger and then conveying a proportion of the fuel from the primary heat exchanger through the secondary fuel-oil heat exchanger.

The proportion of the fuel from the primary heat exchanger 1004 sent through the secondary fuel-oil heat exchanger 1006 may be adjusted depending on the calorific value of the fuel—in particular, a higher proportion of fuel may be sent through the secondary fuel-oil heat exchanger 1006 when the calorific value of the fuel is higher.

Further, the method 10000 may comprise diverting a portion of the fuel leaving the primary heat exchanger 1004 back to an inlet of the primary heat exchanger 1004, for example using a recirculation valve 6010 and pipe 6011 as described above. A higher proportion of fuel may be sent back to the inlet of the primary fuel-oil heat exchanger 1004 when the calorific value of the fuel is higher. The proportion of fuel diverted may therefore be adjusted based on calorific value of the fuel, and optionally on one or more other parameters such as total flow rate of fuel leaving the pump 1003 and required engine power or shaft speed.

The adjustments may be performed automatically by the fuel management system 1500, 6500.

The relationship between the calorific value of the fuel and the proportion diverted to a secondary heat exchanger 1006 or recirculated through the primary heat exchanger 1004 may be proportional.

The diverted fuel may be taken from an outlet of the pump 1003 back to the inlet of the primary heat exchanger 1004, which is located before the pump 1003 along the fuel flow path. The diverted fuel may therefore flow through both the primary heat exchanger 1004 and the pump 1003 at least twice without having returned to a fuel tank 50, 53 therebetween.

Step 10300: Providing at least a proportion of the fuel to the combustor 16 to be combusted.

Fuel sent to the secondary heat exchanger 1006 may be sent back to a fuel tank 50, 53 rather than being provided to the combustor 16.

The fuel management systems 1500, 6500 as described herein may therefore allow fuel flow rate and/or fuel temperature on reaching the combustor 16 to be adjusted as appropriate for specific fuel properties, improving engine performance.

The inventors also appreciated that the use of different fuels may allow for more heat to be safely transferred from the oil to the fuel per unit volume of the fuel through the heat exchange system, and that adapting control of the engine 10 to make use of this may improve efficiency and/or longevity of the engine 10. For example, careful control of fuel temperatures on entry to the combustor 16 may allow for improved oil cooling and/or improved fuel burn efficiency, as discussed above.

Figure 11:
FIG. 11 illustrates a further example method of operating a gas turbine engine.
Figure 11:
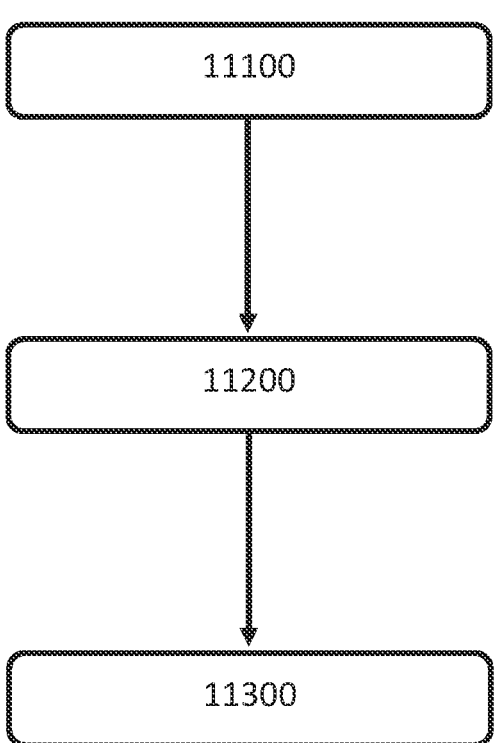

FIG. 11 illustrates an example method 11000 of operating a gas turbine engine 10. The method 11000 comprises the steps of:

Step 11100: Conveying up to 100% of the fuel from the fuel tank through the primary fuel-oil heat exchanger (noting that some may instead pass through a bypass pipe 1005) and then conveying a proportion of the fuel from the primary heat exchanger through the secondary fuel-oil heat exchanger.

Step 11200: Transferring 200-600 kJ/m³ of heat from the oil to the fuel at cruise conditions, using the primary fuel-oil heat exchanger 1004 of the heat exchange system.

Step 11300: Providing heated fuel to the combustor 16 of the gas turbine engine 10.

As discussed with respect to FIG. 5, the fuel management system 1500 comprises the primary fuel-oil heat exchanger 1004 and the secondary fuel-oil heat exchanger 1006 arranged to transfer heat to or from the fuel. An engine fuel pump 1003 is positioned downstream of the primary fuel-oil heat exchanger 1004 and upstream of the secondary fuel-oil heat exchanger 1006. The fuel management system 1000 is arranged so that the fuel reaches the primary fuel-oil heat exchanger 1004 before the secondary fuel-oil heat exchanger 1006.

Heating the fuel to higher temperatures than previously used may improve the cooling of the oil before it is returned to the rest of the turbine engine 10, and/or may improve combustion efficiency of the fuel. The positioning of the secondary fuel-oil heat exchanger 1006 after the engine fuel pump may allow for still more heat to be removed from the oil without compromising fuel pump longevity (as discussed above), and, in implementations in which some or all of the fuel leaving the secondary fuel-oil heat exchanger 1006 is delivered to the combustor, passing through the secondary fuel-oil heat exchanger 1006 may increase the amount of heat added to the fuel to be combusted.

A recirculation pipe 6011 as described above may also be used to assist with the control of the heat transfer to the fuel before it reaches the combustor 16—for example, if the fuel has had too little heat transferred to it, some or all of the fuel may be diverted back to the inlet of the primary heat exchanger 1004 for additional heating. One or more temperature sensors may be used as part of a feedback loop to adjust the proportion of fuel recirculated, and/or the proportion of fuel sent to the secondary fuel-oil heat exchanger 1006, as appropriate.

The method of FIG. 11 may be used in conjunction with the method of FIG. 10.

The inventors also appreciated that careful control of fuel viscosity on entrance to the combustor 16 can improve engine performance. In particular, adjusting the method of engine control to provide a lower viscosity on entrance to the combustor 16 can improve combustion efficiency, in particular with respect to fuel nozzle spray performance within the combustor 16, as discussed above.

Figure 12:
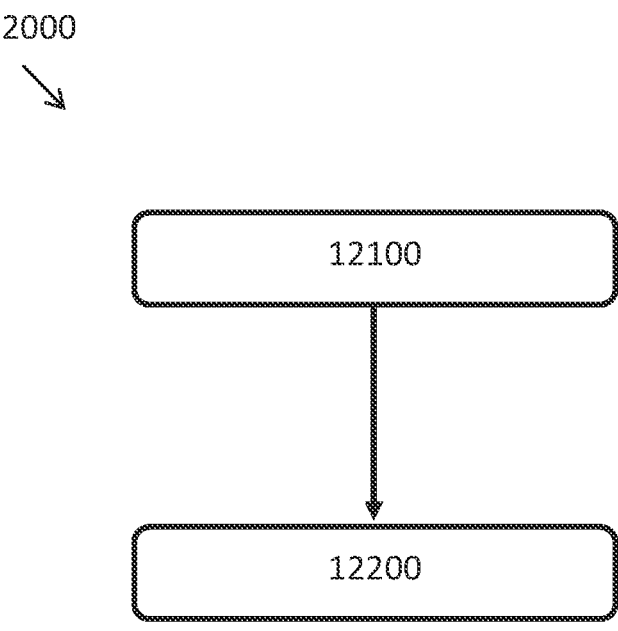
FIG. 12 illustrates a further example method of operating a gas turbine engine.

FIG. 12 illustrates an example method 12000 of operating a gas turbine engine 10. The method 12000 comprises the steps of:

Step 12100: Providing a fuel to the combustor 16 of the gas turbine engine 10, optionally via a fuel management system 1500, 6500 as described above.

As discussed with respect to FIGS. 5, 6A and 6B, the fuel management system 1500, 6500 comprises a primary fuel-oil heat exchanger 1004 and a secondary fuel-oil heat exchanger 1006 arranged to transfer heat to or from the fuel. An engine fuel pump 1003 is positioned downstream of the primary fuel-oil-heat exchanger 1004 and upstream of the secondary fuel-oil heat exchanger 1006. The fuel management system 1500 is arranged so that the fuel reaches the primary fuel-oil heat exchanger 1004 before the secondary fuel-oil heat exchanger 1006.

At least a proportion of the fuel leaving the primary fuel-oil heat exchanger 1004 is provided to the combustor 16. Fuel which passes through the secondary fuel-oil heat exchanger 1006 after leaving the primary fuel-oil heat exchanger 1004 may be provided to the combustor 16, or may instead be returned to a fuel tank 50, 53 for later re-use. In still further alternative implementations, fuel which passes through the secondary fuel-oil heat exchanger 1006 after leaving the primary fuel-oil heat exchanger 1004 may be provided to auxiliary engine systems 7010 such as fueldraulics, before being either returned to the tank 50 or to the main fuel flow path. Fuel leaving the auxiliary engine systems 7010 may be recirculated through one or more heat exchangers 1004, 1006 through which it had already passed.

Step 12200: Using at least one of the primary fuel-oil heat exchanger 1004 and the secondary fuel-oil heat exchanger 1006 to heat the fuel so as to adjust the fuel viscosity so that it is no more than 0.58 mm²/s (i.e. a maximum of 0.58 mm²/s and preferably lower) on entry to the combustor 16 at cruise conditions. This use of the heat exchanger(s) may be or comprise controlling fuel and/or oil flow through the primary and secondary fuel-oil heat exchangers 1004, 1006 so as to adjust the fuel viscosity to lower than 0.58 mm²/s on entry to the combustor at cruise conditions. Step 12200 therefore generally involves using heat to reduce the fuel viscosity.

In various implementations as discussed above, the controlling 12200 the heat exchange system may comprise controlling fuel flow through the primary and secondary fuel-oil heat exchangers 1004, 1006.

Fuel flow may be controlled using a recirculation valve 6010 where present. An actively controlled amount of fuel leaving the primary heat exchanger 1004 may be recirculated to the primary heat exchanger 1004 rather than flowing on to the combustor 16. This recirculation may also take fuel which has already passed through the engine fuel pump 1003 back to a position upstream of the engine fuel pump 1003.

Alternatively or additionally, fuel flow may be controlled by using one or more bypass pipes arranged to allow a proportion of the fuel to avoid passing through either or both fuel-oil heat exchangers e.g. bypass pipe 1005 shown in FIG. 5 and arranged to allow fuel to bypass the primary heat exchanger 1004.

The speed of the pump 1003 may also be adjusted, either speeding up fuel flow rate (so reducing heat transfer per unit volume passing through the heat exchangers) or reducing fuel flow rate (so increasing heat transfer per unit volume passing through the heat exchangers). One or more additional or alternative controllable valves, pumps, and/or sensors may be provided accordingly to facilitate fuel flow control.

The controlling 12200 the heat exchange system 1004, 1006 may comprise controlling oil flow through the primary and secondary fuel-oil heat exchangers 1004, 1006, and/or through one or more other heat exchangers—e.g. an oil-oil heat exchanger between separate closed loop oil systems or an air-oil heat exchanger.

Additionally or alternatively, as for fuel flow, oil flow may be controlled using one or more bypass pipes, where present, allowing oil to bypass one or more heat exchangers 1004, 1006 instead of flowing therethrough. Oil may also be recirculated in some implementations, and/or oil flow rate may be adjusted by controlling one or more oil pumps. One or more controllable valves, pumps, and/or sensors may be provided accordingly to facilitate oil flow control.

The heat exchange system may comprise a controller arranged to implement this control. The controller may receive inputs from one or more temperature sensors, and may control one or more valves (e.g. recirculation valve 6010), and/or the pump 1003, based on the received data. One or more oil feed pumps and/or scavenge pumps may also be controlled by the controller.

A controlled amount of heat may therefore be transferred from the oil to the fuel in this step 12200 of the method 12000.

This active control may be performed based on one or more parameters such as:

Core shaft speed and engine thrust demand;

Current fuel temperature and/or oil temperature at one or more locations;

Fuel calorific value;

Fuel viscosity;

Fan rotational speed;

Fuel flow rate to the combustor (commonly referred to as WFE-Weight of Main Engine Fuel Flow); and Main/engine fuel pump speed, or speed options.

In alternative examples, the control of the amount of fuel leaving the primary heat exchanger 1004 to be recirculated may not be an active method step—instead, a set, fixed, proportion of the fuel may be recirculated. Alternatively, no fuel may be recirculated, and no recirculation route may be available in some implementations.

A recirculation pipe 6011 as described above may also be used to assist with the control of the viscosity of fuel reaching the combustor 16—for example, if the fuel is too cool and therefore has too high a viscosity, it may be diverted back to the inlet of the primary heat exchanger 1004 for additional heating. One or more temperature sensors may be used as part of a feedback loop to adjust the proportion of fuel recirculated, and/or the proportion of fuel sent to the secondary fuel-oil heat exchanger 1006, as appropriate.

Careful engine management to obtain a lower viscosity of fuel on entry to the combustor 16 may improve combustion efficiency. Fuel flow and heat exchange properties can be adjusted to provide this difference in viscosity.

The method of FIG. 12 may be used in conjunction with the method of FIG. 10 and/or the method of FIG. 11.

It will be understood that the invention is not limited to the implementations above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of operating a gas turbine engine, the gas turbine engine comprising:

a fuel delivery system arranged to provide fuel;

a combustor arranged to combust at least a proportion of the fuel;

a primary fuel-oil heat exchanger arranged to have up to 100% of the fuel provided by the fuel delivery system flow therethrough; and a secondary fuel-oil heat exchanger arranged to have a proportion of the fuel from the primary heat exchanger flow therethrough, and wherein fuel is arranged to flow from the primary fuel-oil heat exchanger to the secondary fuel-oil heat exchanger and oil is arranged to flow from the secondary fuel-oil heat exchanger to the primary fuel-oil heat exchanger;

wherein the method comprises selecting one or more fuels such that the calorific value of the fuel provided to the combustor is at least 43.5 MJ/kg, and wherein the primary fuel-oil heat exchanger is responsible for 70-90% of the heat transfer and the secondary fuel-oil heat exchanger is responsible for 30-10% of the heat transfer, wherein the heat transfer by the primary fuel-oil heat exchanger and secondary fuel-oil heat exchanger totals to 100%.

2. The method of claim 1, wherein the method comprises providing fuel to the combustor having a calorific value of between 43.5 MJ/kg and 44 MJ/kg.

3. The method of claim 1, wherein the method comprises providing fuel to the combustor having a calorific value of at least 43.8 MJ/kg.

4. The method of claim 1, wherein the secondary fuel-oil heat exchanger is a servo fuel-oil heat exchanger.

5. The method of claim 1, wherein between 10% and 30% of the fuel is delivered to the secondary fuel-oil heat exchanger.

6. The method of claim 1, wherein between 10% and 20% of the fuel is delivered to the secondary fuel-oil heat exchanger.

7. The method of claim 1, wherein the primary fuel-oil heat exchanger is responsible for 80% of the heat transfer and the secondary fuel-oil heat exchangers is responsible for 20% of the heat transfer.

8. The method of claim 1, wherein the fuel delivery system comprises a pump located downstream of the primary fuel-oil heat exchanger and a recirculation pipe arranged to allow fuel leaving the pump to return to a point on the fuel flow path before the pump, and wherein the method comprises adjusting the proportion of fuel recirculated via the recirculation pipe based on the calorific value of the fuel.

9. The method of claim 1, wherein the fuel delivery system comprises a recirculation pipe arranged to allow fuel leaving the primary heat exchanger to return to a point on the fuel flow path before the primary heat exchanger, and wherein the method comprises adjusting the proportion of fuel recirculated via the recirculation pipe based on the calorific value of the fuel.

10. The method of claim 1, wherein the fuel which passes through the secondary fuel-oil heat exchanger is not provided to the combustor, but instead used for fueldraulics and then returned to an aircraft fuel tank, and wherein the method comprises adjusting the proportion of fuel sent to the secondary fuel-oil heat exchanger based on the calorific value of the fuel.

11. The method of claim 1, wherein the fuel delivery system is arranged to be able to obtain a plurality of different fuels from different aircraft fuel tanks, and wherein the selecting one or more fuels such that the calorific value of the fuel provided to the combustor is at least 43.5 MJ/kg comprises selecting one or more tanks of the plurality of different aircraft fuel tanks from which to draw fuel.

12. The method of claim 1, wherein the method is employed on an aircraft with a single fuel source, and the selecting one or more fuels such that the calorific value of the fuel provided to the combustor is at least 43.5 MJ/kg comprises selecting an appropriate fuel on refuelling the aircraft.

13. A gas turbine engine for an aircraft, the gas turbine engine comprising:

a fuel delivery system arranged to provide fuel;

a combustor arranged to combust at least a proportion of the fuel;

a primary fuel-oil heat exchanger arranged to have up to 100% of the fuel provided by the fuel delivery system flow therethrough; and a secondary fuel-oil heat exchanger arranged to have a proportion of the fuel from the primary fuel-oil heat exchanger flow therethrough, and wherein fuel is arranged to flow from the primary fuel-oil heat exchanger to the secondary fuel-oil heat exchanger and oil is arranged to flow from the secondary fuel-oil heat exchanger to the primary fuel-oil heat exchanger; and wherein the calorific value of the fuel provided to the combustor is at least 43.5 MJ/kg, and wherein the primary fuel-oil heat exchanger is responsible for 70-90% of the heat transfer and the secondary fuel-oil heat exchanger is responsible for 30-10% of the heat transfer, wherein the heat transfer by the primary fuel-oil heat exchanger and secondary fuel-oil heat exchanger totals to 100%.

14. The gas turbine engine of claim 13, wherein the fuel has a calorific value of between 43.5 MJ/kg and 44 MJ/kg.

15. The gas turbine engine of claim 13, wherein the fuel has a calorific value of at least 43.8 MJ/kg.

16. The gas turbine engine of claim 13, wherein the fuel delivery system comprises a pump, and wherein the pump is located downstream of the primary fuel-oil heat exchanger and upstream of the secondary fuel-oil heat exchanger.

17. The gas turbine engine of claim 13, wherein the fuel delivery system comprises a recirculation pipe, the recirculation pipe being arranged to divert a proportion of the fuel leaving the primary fuel-oil heat exchanger back to an inlet of the primary fuel-oil heat exchanger.

18. The gas turbine engine of claim 13, wherein the primary fuel-oil heat exchanger is responsible for 80% of the heat transfer and the secondary fuel-oil heat exchangers is responsible for 20% of the heat transfer.

19. A method of operating a gas turbine engine, the gas turbine engine comprising:

a fuel delivery system arranged to provide fuel;

a combustor arranged to combust at least a proportion of the fuel;

a primary fuel-oil heat exchanger arranged to have up to 100% of the fuel provided by the fuel delivery system flow therethrough; and a secondary fuel-oil heat exchanger arranged to have a proportion of the fuel from the primary heat exchanger flow therethrough, and wherein fuel is arranged to flow from the primary fuel-oil heat exchanger to the secondary fuel-oil heat exchanger and oil is arranged to flow from the secondary fuel-oil heat exchanger to the primary fuel-oil heat exchanger;

wherein the method comprises selecting one or more fuels such that the calorific value of the fuel provided to the combustor is at least 43.5 MJ/kg, and wherein the fuel delivery system comprises a recirculation pipe arranged to allow fuel leaving the primary heat exchanger to return to a point on the fuel flow path before the primary heat exchanger, and wherein the method comprises adjusting the proportion of fuel recirculated via the recirculation pipe based on the calorific value of the fuel.

* * * * *